US009276674B2

(12) United States Patent
Sun et al.

(10) Patent No.: US 9,276,674 B2
(45) Date of Patent: Mar. 1, 2016

(54) ESTIMATING PHASE USING TEST PHASES AND INTERPOLATION FOR MODULATION FORMATS USING MULTIPLE SUB-CARRIERS

(71) Applicant: Infinera Corporation, Sunnyvale, CA (US)

(72) Inventors: Han H. Sun, Ottawa (CA); Sandy Thomson, Ottawa (CA); Yuejian Wu, Woodlawn (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/231,379

(22) Filed: Mar. 31, 2014

(65) Prior Publication Data

US 2015/0280814 A1    Oct. 1, 2015

(51) Int. Cl.
*H04L 1/00*  (2006.01)
*H04B 10/077*  (2013.01)
*H04L 27/22*  (2006.01)
*H04L 7/00*  (2006.01)
*H04L 27/00*  (2006.01)

(52) U.S. Cl.
CPC .......... *H04B 10/0775* (2013.01); *H04L 7/0016* (2013.01); *H04L 27/0014* (2013.01); *H04L 27/223* (2013.01)

(58) Field of Classification Search
CPC .. H04L 7/0016; H04L 27/223; H04L 27/0014
See application file for complete search history.

(56) References Cited

U.S. PATENT DOCUMENTS

| 5,793,800 | A  | * | 8/1998  | Jylha et al. ................. 375/219 |
| 5,910,960 | A  | * | 6/1999  | Claydon et al. ............. 714/784 |
| 6,396,889 | B1 | * | 5/2002  | Sunter et al. ................ 375/376 |
| 6,968,480 | B1 | * | 11/2005 | Yuan et al. .................. 714/700 |
| 7,251,574 | B1 | * | 7/2007  | Bhattacharya et al. ...... 702/79 |
| 7,336,728 | B2 | * | 2/2008  | Dorrer et al. ............... 375/308 |
| 7,356,077 | B2 | * | 4/2008  | Fala et al. .................. 375/224 |
| 7,870,445 | B2 | * | 1/2011  | Saponas et al. ............. 714/704 |
| 8,774,320 | B2 |   | 7/2014  | Sun et al. |

(Continued)

OTHER PUBLICATIONS

Wikipedia, "Carrier Recovery", http://en.wikipedia.org/wiki/Carrier_recovery, Feb. 3, 2014, 4 pages.

(Continued)

*Primary Examiner* — Esaw Abraham
(74) *Attorney, Agent, or Firm* — Harrity & Harrity LLP; David L. Soltz

(57) ABSTRACT

An optical receiver may receive input signals carried by sub-carriers, and may apply test phases to each input signal. The optical receiver may determine error values, associated with test phases, for each input signal. The optical receiver may calculate updated metric values, associated with the test phases, for a particular input signal, based on a first error value and a second error value. The first error value may be associated with a first sub-carrier, and the second error value may be associated with a second sub-carrier. The optical receiver may compare the updated metric values associated with the particular input signal, and may determine a test phase that represents an estimated phase, associated with the particular input signal, based on the comparison. The optical receiver may determine a phase estimate value based on the test phase, and may provide the phase estimate value to modify the particular input signal.

20 Claims, 20 Drawing Sheets

(56) References Cited

U.S. PATENT DOCUMENTS

| | | | |
|---|---|---|---|
| 8,861,647 B2* | 10/2014 | Zhou | 375/326 |
| 2014/0092924 A1 | 4/2014 | Krause et al. | |
| 2015/0030333 A1 | 1/2015 | Sun et al. | |
| 2015/0188642 A1 | 7/2015 | Sun et al. | |

OTHER PUBLICATIONS

Timo Pfau et al., "Hardware-Efficient Coherent Digital Receiver Concept with Feedforward Carrier Recovery for $M$-QAM Constellations", Journal of Lightwave Technology, vol. 27, No. 8, Apr. 15, 2009, pp. 989-999.

Xiang Zhou, "An Improved Feed-Forward Carrier Recovery Algorithm for Coherent Receivers with $M$-QAM Modulation Format", IEEE Photonics Technology Letters, vol. 22, No. 14, Jul. 15, 2010, pp. 1051-1053.

Wikipedia, "Laser linewidth", http://en.wikipedia.org/wiki/Laser_linewidth, Feb. 8, 2014, 3 pages.

Wikipedia, "Quadrature amplitude modulation", http://en.wikipedia.org/wiki/Quadrature_amplitude_modulation, Feb. 21, 2014, 9 pages.

* cited by examiner

ESTIMATING PHASE USING TEST PHASES AND INTERPOLATION FOR MODULATION FORMATS USING MULTIPLE SUB-CARRIERS

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

SUMMARY

According to some possible implementations, an optical receiver may include a digital signal processor. The digital signal processor may receive input signals carried by respective sub-carriers. The digital signal processor may apply test phases to each input signal, and may determine error values, respectively associated with the test phases, for each input signal. The digital signal processor may selectively combine a first error value, associated with a first input signal, and a second error value, associated with a second input signal. The first input signal may be carried by a first sub-carrier, and the second input signal may be carried by a second sub-carrier. The second sub-carrier may be different from the first sub-carrier. The digital signal processor may calculate updated metric values, respectively associated with the test phases, for a particular input signal, based on selectively combining the first error value and the second error value. The digital signal processor may compare the updated metric values associated with the particular input signal, and may determine a test phase that represents an estimated phase, associated with the particular input signal, based on comparing the plurality of updated metric values. The digital signal processor may determine a phase estimate value based on the test phase, and may provide the phase estimate value to modify the particular input signal.

According to some possible implementations, a system may include an optical receiver. The optical receiver may receive input signals carried by respective sub-carriers, and may apply test phases to each input signal. The optical receiver may determine error values, respectively associated with test phases, for each input signal. The optical receiver may calculate updated metric values, respectively associated with the test phases, for a particular input signal, based on a first error value and a second error value. The first error value may be associated with a first sub-carrier, and the second error value may be associated with a second sub-carrier. The second sub-carrier may be different from the first sub-carrier. The optical receiver may compare the updated metric values associated with the particular input signal, and may determine a test phase that represents an estimated phase, associated with the particular input signal, based on comparing the updated metric values. The optical receiver may determine a phase estimate value based on the test phase, and may provide the phase estimate value to modify the particular input signal.

According to some possible implementations, a method may include receiving, by an optical receiver, input signals carried by respective sub-carriers. The method may include applying, by the optical receiver, test phases to each input signal, and determining, by the optical receiver, error values, respectively associated with test phases, for each input signal. The method may include calculating, by the optical receiver, final error values, respectively associated with the test phases, for a particular input signal, based on a first error value and a second error value. The first error value may be associated with a first sub-carrier, and the second error value may be associated with a second sub-carrier. The second sub-carrier may be different from the first sub-carrier. The method may include comparing, by the optical receiver, the final error values, associated with the particular input signal, to determine a minimum final error value. The method may include identifying, by the optical receiver, a test phase associated with the minimum final error value, and determining, by the optical receiver and based on the identified test phase, a phase estimate value that represents an estimated phase associated with the particular input signal. The method may include providing, by the optical receiver, the phase estimate value to modify the particular input signal.

DETAILED DESCRIPTION

The following detailed description of example implementations refers to the accompanying drawings. The same reference numbers in different drawings may identify the same or similar elements.

In a WDM system, a transmitter may modulate an amplitude and/or a phase of a signal in order to convey data, via the signal, to a receiver where the signal may be demodulated to recover the data included in the signal. A particular modulation format (e.g., phase-shift keying (PSK), quadrature amplitude modulation (QAM), quadrature phase-shift keying (QPSK), binary phase-shift keying (BPSK), polarization-multiplexed quadrature phase-shift keying (PM-QPSK), etc.) may be used to modulate the signal. When the signal is transmitted or received over a link, random phase fluctuations in the signal may be introduced via the transmitter, the receiver, and/or the link. These random phase fluctuations may be compensated by the receiver during carrier phase recovery to correct a phase error introduced into the modulated signal, thus permitting the receiver to properly decode the modulated signal.

In a coherent receiver, the received signal is sampled by analog-to-digital converters (ADCs) for signal processing. Although 2 samples/symbol or less may be used for the CD compensation and PMD equalization, the subsequent carrier recovery uses 1 sample/symbol. During carrier phase recovery, the receiver may apply test phases to a received sample to determine the most-likely transmitted symbol. For example, the receiver may apply a maximum likelihood phase estimate technique by rotating a received sample using each test phase to decode the received sample into a symbol. The receiver may determine which rotated sample is closest to (e.g., has the smallest Euclidean distance to) a constellation point (e.g., included in a constellation diagram for a particular modulation format), which corresponds to the decoded symbol. However, this technique may require a large number of test phases to generate an accurate estimate of the phase to be corrected for the received sample, which may be computationally expensive. Implementations described herein reduce the computational complexity of accurately estimating the phase error contained in a received sample. Furthermore, implementations described herein introduce a technique for performing carrier recovery when signals are transmitted using multiple digital sub-carriers, rather than a single carrier.

Figure 1A:
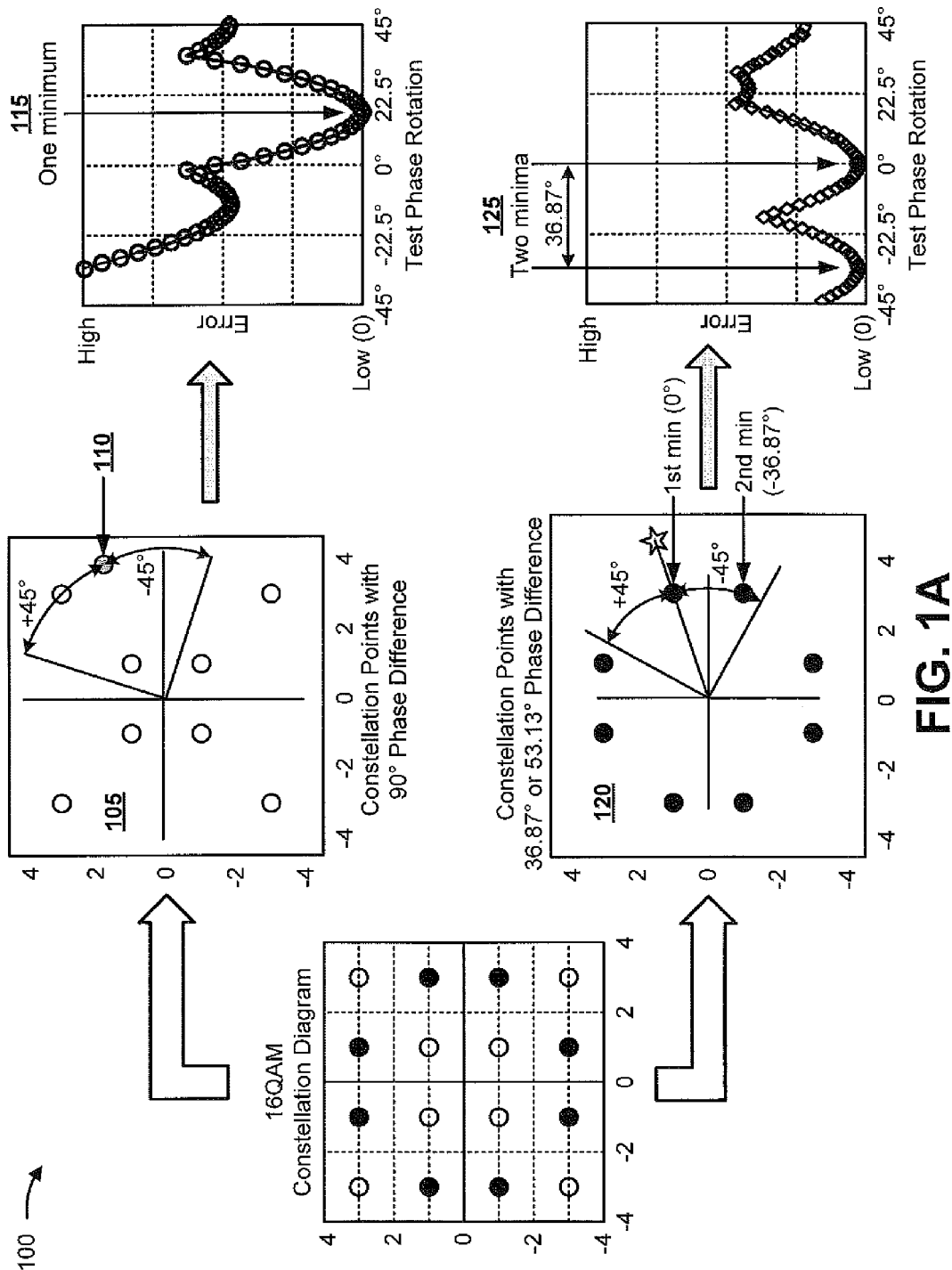
FIGS. 1A-1C are diagrams of an overview of an example implementation described herein.
Figure 1B:
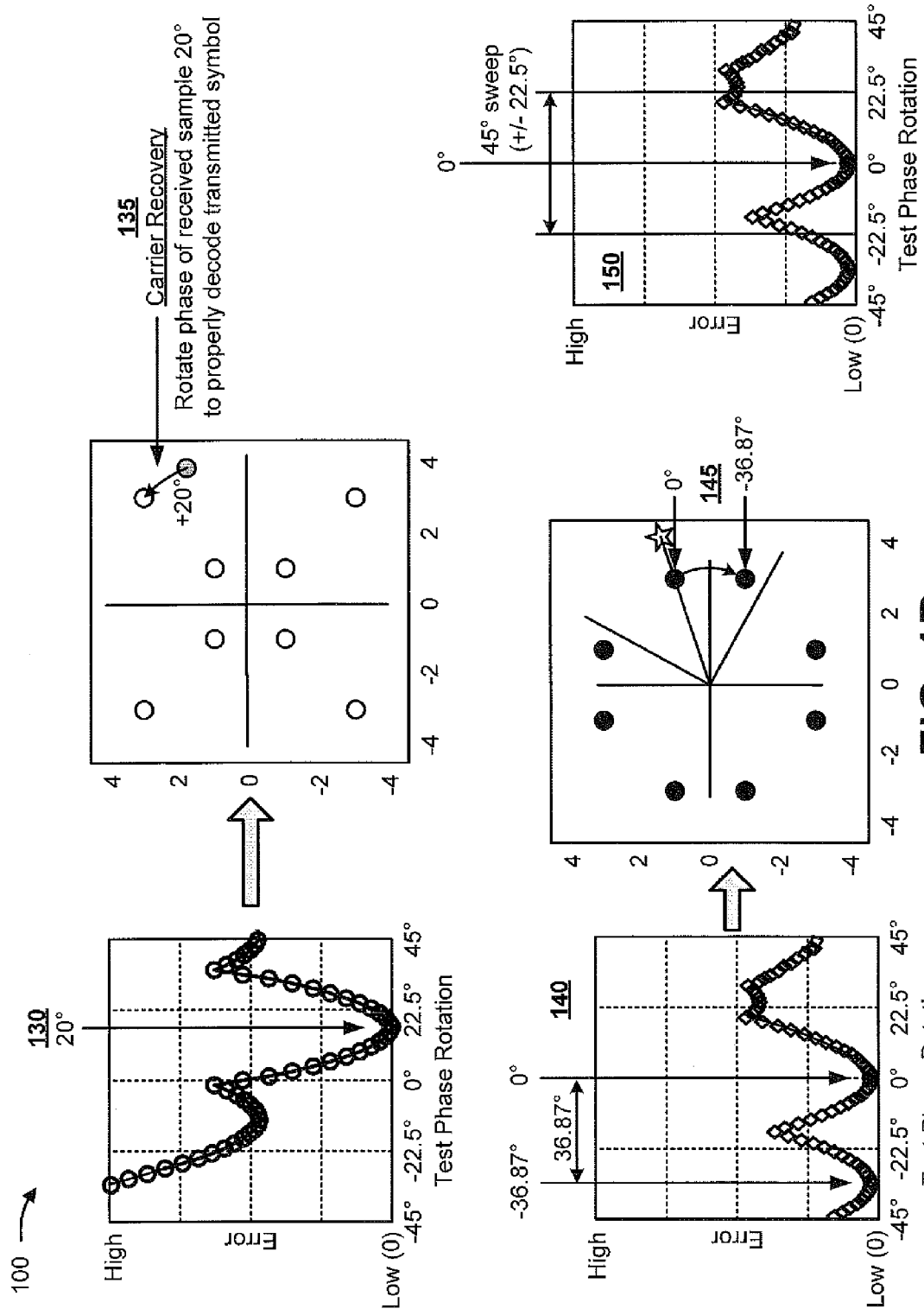
Figure 1C:
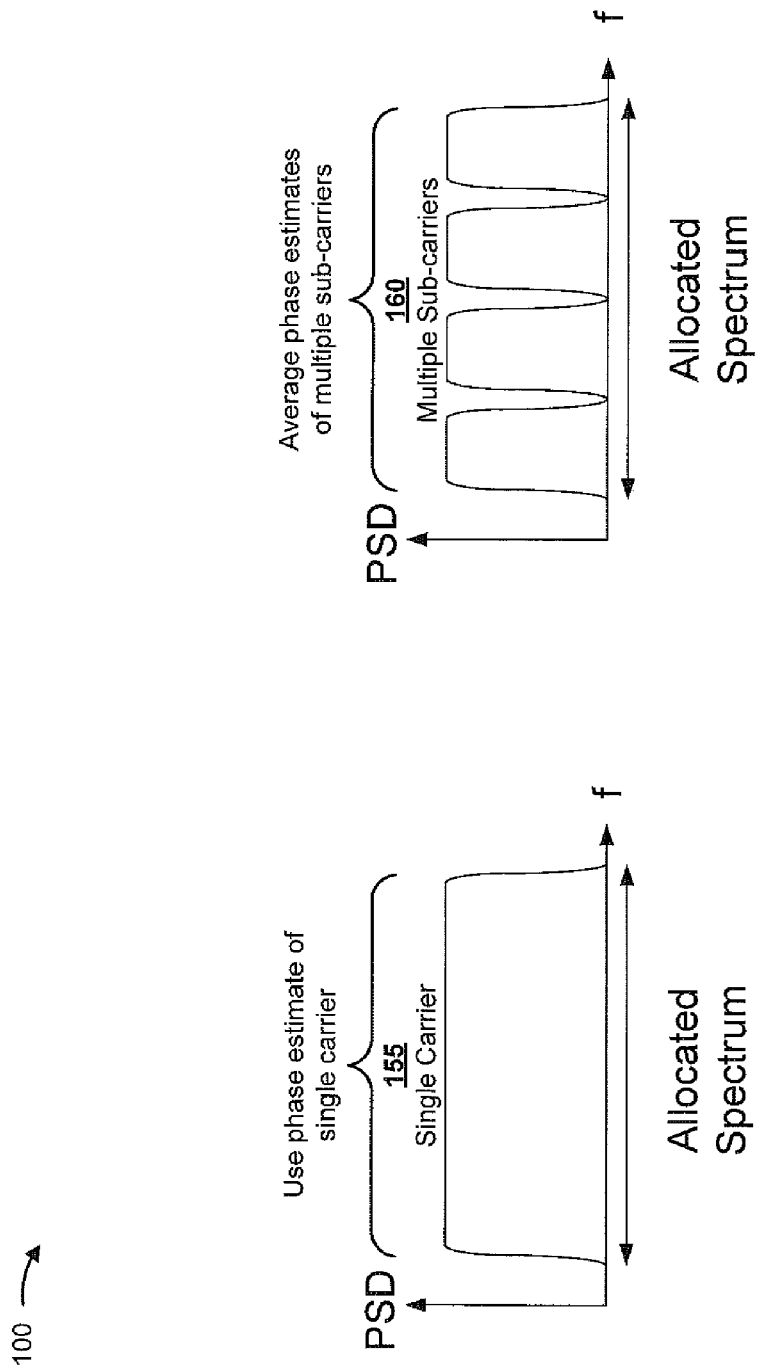

FIGS. 1A-1C are diagrams of an overview of an example implementation 100 described herein. FIG. 1A shows a constellation diagram that represents all possible symbols that may be transmitted via a signal modulated using a rectangular 16QAM modulation format. As shown by reference number 105, some of the constellation points (e.g., symbols) in the constellation diagram are separated by a phase difference of 90 degrees (e.g., the constellation points represented by a white dot with a black outline). As shown by reference number 110, when a receiver receives a sample corresponding to a symbol, the sample may include a phase error that, if not corrected, would be decoded to an incorrect symbol in the constellation diagram. For example, a phase error may have been introduced into the sample during transmission (e.g., due to random noise introduced into the sample/signal by the receiver, by a transmitter, during transmission via a fiber, etc.). The receiver may correct a phase error in the sample by rotating the sample using a set of test phases, and determining an error (e.g., a distance), for each test phase, between the rotated sample and the nearest constellation point in the constellation diagram. For example, the receiver may rotate the received sample using a set of test phases between −45 degrees and 45 degrees, as shown. As shown by reference number 115, applying this carrier recovery technique to a constellation point with a 90 degree phase difference results in one minimum error value, which corresponds to the phase estimate for carrier recovery.

This carrier recovery technique cannot be used to easily correct a phase error associated with symbols in the constellation diagram that are separated by a phase difference of 36.87 degrees or 53.13 degrees (e.g., the symbols represented by a black dot with a black outline), which are shown by reference number 120. The star in the constellation diagram represents a received sample. As shown, the receiver may scan +/−45 degrees from the received sample to identify a correct constellation point. Assume that the correct constellation point is found at a test phase of zero degrees, which corresponds to a first minimum error value. However, there is also a second minimum error value at a test phase of −36.87 degrees, which causes an ambiguity. These two minima associated with the error values (e.g., at 0 degrees and −36.87 degrees) are also shown by reference number 125.

As shown in FIG. 1B, and by reference number 130, assume that the minimum error value for the received 90 degree phase difference symbol corresponds to a phase rotation of 20 degrees. Thus, to perform carrier recovery for the received sample, the receiver may rotate the phase of the received sample by 20 degrees to correct for the phase error so that the received sample may be properly decoded to the transmitted symbol, as shown by reference number 135.

As shown by reference number 140, assume that the two minimum error values for correspond to test phases of zero degrees and −36.87 degrees. Assume that the receiver properly performs carrier recovery by selecting the test phase of zero degrees. To perform carrier recovery for additional received samples, the receiver may use test phases that range from −22.5 degrees and 22.5 degrees around the selected test phase (e.g., a 45 degree sweep centered at 0 degrees), thereby eliminating the possibility of determining two minimum error values, as shown by reference number 150. Thus, implementations described herein assist in accurately and efficiently correcting phase errors in received samples.

As shown in FIG. 1C, implementations described herein may also assist in accurately and efficiently correcting phase errors in received samples when the samples are carried on signals transmitted via multiple digital sub-carriers. Note that by using digital subcarriers, the transmitter and the receiver may use one laser centered at the center of the overall signal spectrum. In an optical communication system, a certain bandwidth, or spectrum, may be allocated to an optical communications channel. As shown by reference number 155, the channel may include a single carrier that carries data via the optical channel. In this case, implementations described herein may use a phase estimate of the single carrier for carrier recovery. As shown by reference number 160, rather than including a single carrier, the channel may include multiple sub-carriers that carry data via the optical channel. In this case, implementations described herein may use an average phase estimate of multiple sub-carriers for carrier recovery. In this way, the receiver may accurately and efficiently determine phase estimates for received symbols, resulting in more accurate and efficient data transmission.

Implementations described herein may perform carrier recovery for different modulation formats, such as M-QAM modulation formats (e.g., 3QAM, 5QAM, 7QAM, 8QAM, 16QAM, etc.), BPSK modulation formats (e.g., Block-4D-BPSK, etc.), QPSK modulation formats (e.g., PM-QPSK, etc.), or the like.

Figure 2:
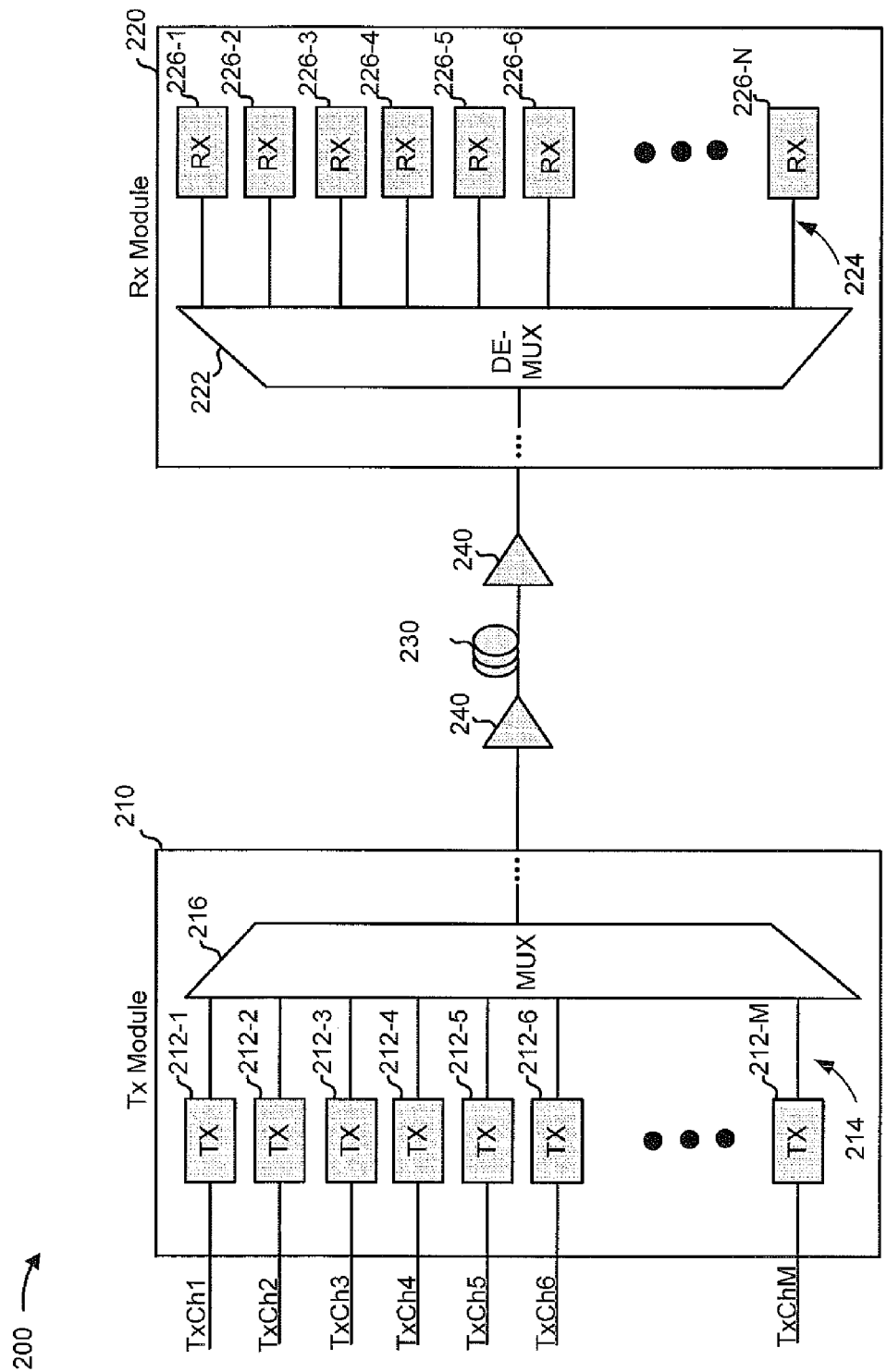
FIG. 2 is a diagram of an example network in which systems and/or methods, described herein, may be implemented.

FIG. 2 is a diagram of an example network 200 in which systems and/or methods, described herein, may be implemented. As shown in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include one or more optical transmitters 212-1 through 212-M (M≥1), one or more waveguides 214, and/or an optical multiplexer 216. In some implementations, transmitter module 210 may include additional components, fewer components, different components, or differently arranged components than those shown in FIG. 2.

Optical transmitter 212 may receive data for a data channel (shown as TxCh1 through TxChM), may create multiple sub-carriers for the data channel, may map data, for the data channel, to the multiple sub-carriers, may modulate the data with an optical signal (e.g., a laser) to create a multiple sub-carrier output optical signal, and may transmit the multiple sub-carrier output optical signal. Optical transmitter 212 may be tuned to use an optical carrier of a designated wavelength. In some implementations, the grid of wavelengths emitted by optical transmitters 212 may conform to a known standard, such as a standard published by the Telecommunication Standardization Sector (ITU-T). Additionally, or alternatively the grid of wavelengths may be flexible and tightly packed to create a super channel.

Waveguide 214 may include an optical link or some other link to transmit output optical signals of optical transmitter 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other type of multiplexer device. In some implementations, optical multiplexer 216 may combine multiple output optical signals, associated with optical transmitters 212, into a single optical signal (e.g., a WDM signal). For example, optical multiplexer 216 may include an input (e.g., a first slab to receive input optical signals supplied by optical transmitters 212) and an output (e.g., a second slab to supply a single WDM signal associated with the input optical signals). Additionally, optical multiplexer 216 may include waveguides connected to the input and the output. In some implementations, optical multiplexer 216 may combine multiple output optical signals, associated with optical transmitters 212, in such a way as to produce a polarization diverse signal (e.g., also referred to herein as a WDM signal). As shown in FIG. 2, optical multiplexer 216 may provide the WDM signal to receiver module 220 via an optical fiber, such as link 230.

Optical multiplexer 216 may receive output optical signals outputted by optical transmitters 212, and may output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier, a Raman amplifier, or the like. Amplifier 240 may amplify the optical signals as the optical signals are transmitted via link 230.

Receiver module 220 may include an optical demultiplexer 222, one or more waveguides 224, and/or one or more optical receivers 226-1 through 226-N(N≥1). In some implementations, receiver module 220 may include additional components, fewer components, different components, or differently arranged components than those shown in FIG. 2.

Optical demultiplexer 222 may include an AWG or some other type of demultiplexer device. In some implementations, optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the input and the output. As shown in FIG. 2, optical demultiplexer 222 may supply optical signals to optical receivers 226 via waveguides 224.

Waveguide 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receiver 226 may include one or more photodetectors and/or similar devices to receive respective input optical signals outputted by optical demultiplexer 222, to detect sub-carriers associated with the input optical signals, to convert data within the sub-carriers to voltage signals, to convert the voltage signals to digital samples, and to process the digital samples to produce output data corresponding to the input optical signals. Optical receivers 226 may each operate to convert the input optical signal to an electrical signal that represents the transmitted data.

The number and arrangement of components shown in FIG. 2 is provided as an example. In practice, network 200 may include additional components, fewer components, different components, or differently arranged components than those shown in FIG. 2. Additionally, or alternatively, a set of devices (e.g., one or more devices) shown in FIG. 2 may perform one or more functions described herein as being performed by another set of devices shown in FIG. 2.

Figure 3:
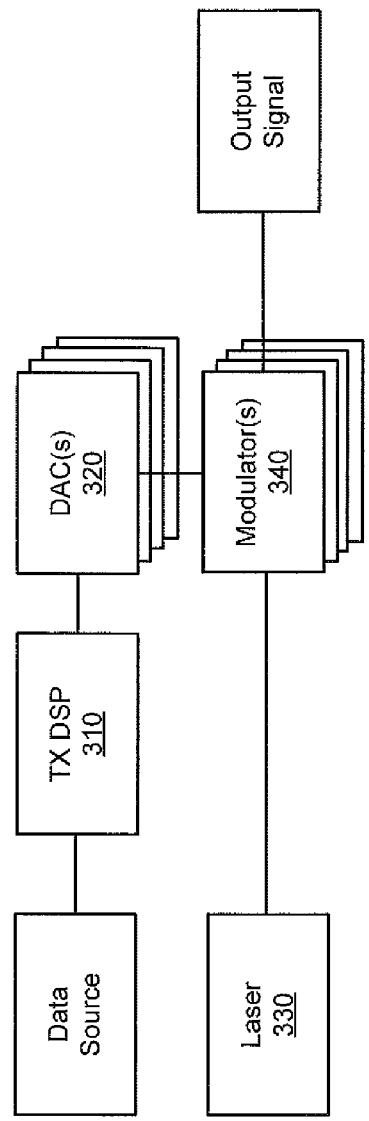
FIG. 3 is a diagram of example components of an optical transmitter shown in FIG. 2.

FIG. 3 is a diagram of example components of an optical transmitter 212. As shown in FIG. 3, optical transmitter 212 may include a TX DSP 310, one or more DACs 320, a laser 330, and one or more modulators 340. In some implementations, TX DSP 310, DAC 320, laser 330, and/or modulator 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and may determine a signal to apply to modulator 340 to generate multiple sub-carriers. In some implementations, TX DSP 310 may receive streams of data, may map the streams of data onto each of the sub-carriers, may independently apply spectral shaping to each of the sub-carriers, and may obtain, based on the spectral shaping of each of the sub-carriers, a sequence of assigned integers to supply to DAC 320. In some implementations, TX DSP 310 may generate the sub-carriers using time-domain or frequency-domain filtering and frequency shifting by a combination of reallocation of frequency bins and multiplication in the time domain.

DAC 320 may include a signal converting device or a collection of signal converting devices. In some implementations, DAC 320 may receive respective digital signals from TX DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular in-phase (I) or quadrature component (Q) of a particular polarization (e.g., an X polarization, a Y polarization) of a dual-pol signal.

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple digital sub-carrier output signal, which may be provided to multiplexer 216.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization and one for a second polarization. The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of an X polarization and a quadrature component of the X polarization), and two DACs 320 may supply voltage signals to the second modulator 340 (e.g., for an in-phase component of a Y polarization and a quadrature component of the Y polarization). The outputs of modulators 340 may be combined back together using combiners (e.g., optical multiplexer 216) and polarization multiplexing.

The number and arrangement of components shown in FIG. 3 is provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 230. Additionally, or alternatively, a set of components shown in FIG. 3 may perform one or more functions described herein as being performed by another set of components shown in FIG. 3.

Figure 4:
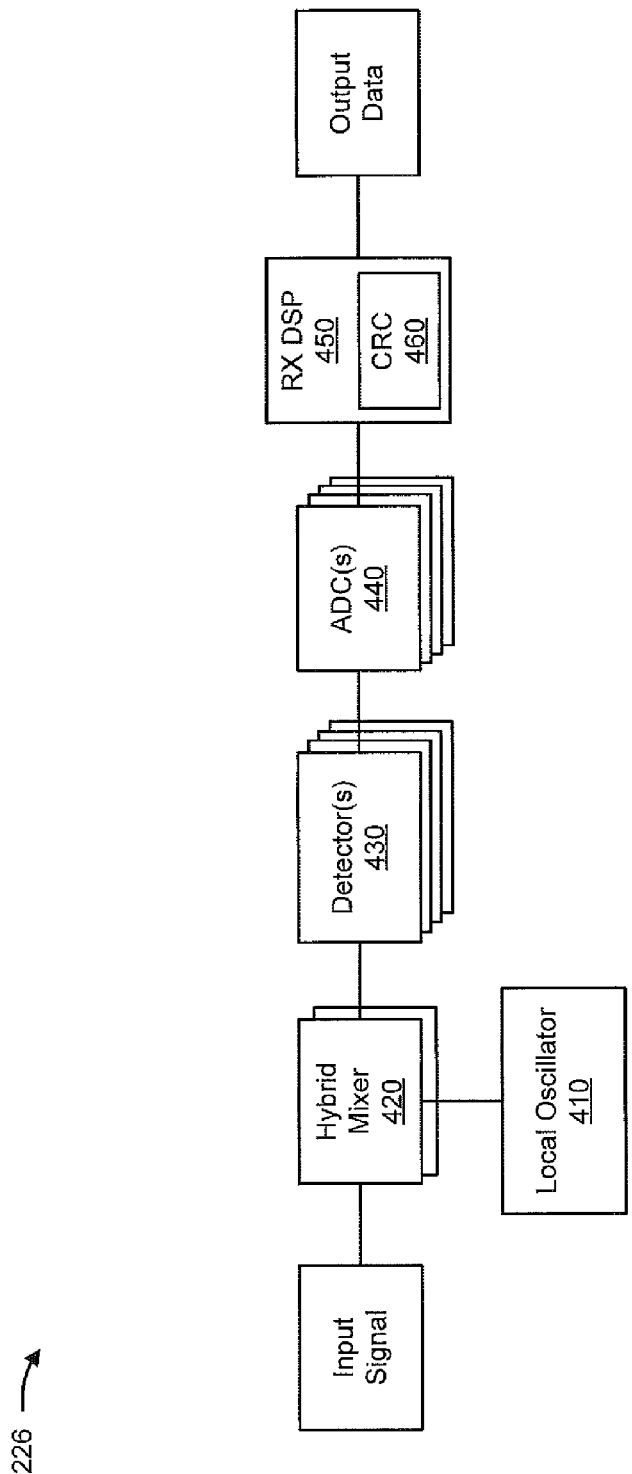
FIG. 4 is a diagram of example components of an optical receiver shown in FIG. 2.

FIG. 4 is a diagram of example components of optical receiver 226. As shown in FIG. 4, optical receiver 226 may include a local oscillator 410, one or more hybrid mixers 420, one or more detectors 430, one or more ADCs 440, and an RX DSP 450, which may include a carrier recovery component (CRC) 460. In some implementations, local oscillator 410, hybrid mixer 420, detector 430, ADC 440, and/or RX DSP 450 may be implemented on one or more integrated circuits, such as one or more PICs, one or more ASICs, or the like. In some implementations, components of multiple optical receivers 226 may be implemented on a single integrated circuit, such as a single PIC plus one or more ASICs, to form a super-channel receiver.

Local oscillator 410 may include a laser, or a similar device. In some implementations, local oscillator 410 may include a laser to provide an optical signal to hybrid mixer 420. In some implementations, local oscillator 410 may include a single-sided laser to provide an optical signal to hybrid mixer 420. In some implementations, local oscillator 410 may include a double-sided laser to provide multiple optical signals to multiple hybrid mixers 420.

Hybrid mixer 420 may include a combiner that receives a first optical signal (e.g., an input signal from optical demultiplexer 222) and a second optical signal (e.g., from local oscillator 410) and combines the first and second optical signals to generate a combined optical signal. In some implementations, hybrid mixer 420 may include a polarization beam splitter (PBS) which splits the first optical signal into two orthogonal signals. The two orthogonal signals may be combined with respective second optical signals (from a laser) with 90 degree phase with respect to each other. Hybrid mixer 420 may provide the combined optical signal to detector 430.

Detector 430 may include a photodetector, such as a photodiode, to receive the output optical signal, from hybrid mixer 420, and to convert the output optical signal to corresponding voltage signals. In some implementations, detector 430 may detect the entire spectrum of the output optical signal (e.g., containing all of the sub-carriers).

In some implementations, optical receiver 226 may include multiple detectors 430, which may be used to detect signals of respective I and Q components of the two orthogonal polarizations. For example, a polarization splitter may receive an input signal, and may split the input signal into two substantially orthogonal polarizations, such as the first polarization and the second polarization. Hybrid mixers 420 may combine the polarization signals with optical signals from local oscillator 410. For example, a first hybrid mixer 420 may combine a first polarization signal with the optical signal from local oscillator 410, and a second hybrid mixer 420 may combine a second polarization signal with the optical signal from local oscillator 410 with 90 degree phase with respect to the first signal of the local oscillator.

Detectors 430 may detect the polarization signals to form corresponding voltage signals, and ADCs 440 may convert the voltage signals to digital samples. For example, two detectors 430 (e.g., balanced PIN diodes) may detect the first polarization signals to form the corresponding voltage signals, and a corresponding two ADCs 440 (e.g., that correspond to an I component and a Q component) may convert the voltage signals to digital samples for the first polarization signals. Similarly, two detectors 430 may detect the second polarization signals to form the corresponding voltage signals, and a corresponding two ADCs 440 (e.g., that correspond to an I component and a Q component) may convert the voltage signals to digital samples for the second polarization signals. RX DSP 450 may process the digital samples for the first and second polarization signals to generate resultant data, which may be outputted as output data.

ADC 440 may include four analog-to-digital converters that convert the voltage signals from detector 430 to digital samples. ADC 440 may provide the digital samples to RX DSP 450.

RX DSP 450 may include a digital signal processor. RX DSP 450 may receive the digital samples from ADC 440, may demultiplex the samples according to the subcarriers, may independently process the samples for each of the subcarriers, may map the processed samples to produce output data, and may output the output data. RX DSP 450 may include CRC 460, which may include one or more components for performing carrier recovery, as described in more detail elsewhere herein.

The number and arrangement of components shown in FIG. 4 is provided as an example. In practice, optical receiver 226 may include additional components, fewer components, different components, or differently arranged components than those shown in FIG. 4. For example, the quantity of hybrid mixers 420, detectors 430, and/or ADCs 440 may be selected to implement an optical receiver 226 that is capable of receiving and processing a polarization diverse signal. Additionally, or alternatively, a set of components shown in FIG. 4 may perform one or more functions described herein as being performed by another set of components shown in FIG. 4.

Figure 5A:
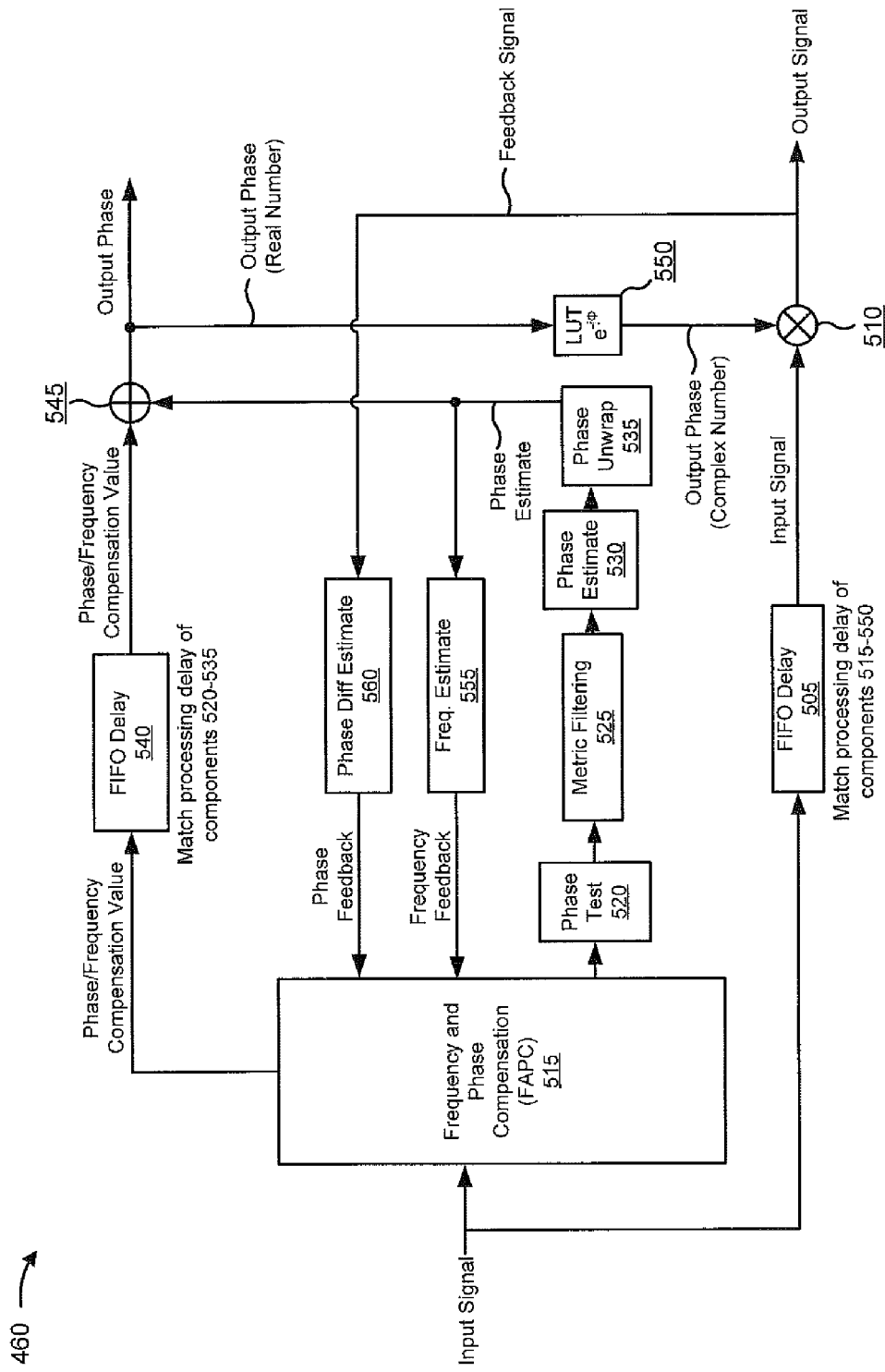
FIGS. 5A and 5B are diagrams of example components of a carrier recovery component shown in FIG. 4.
Figure 5B:
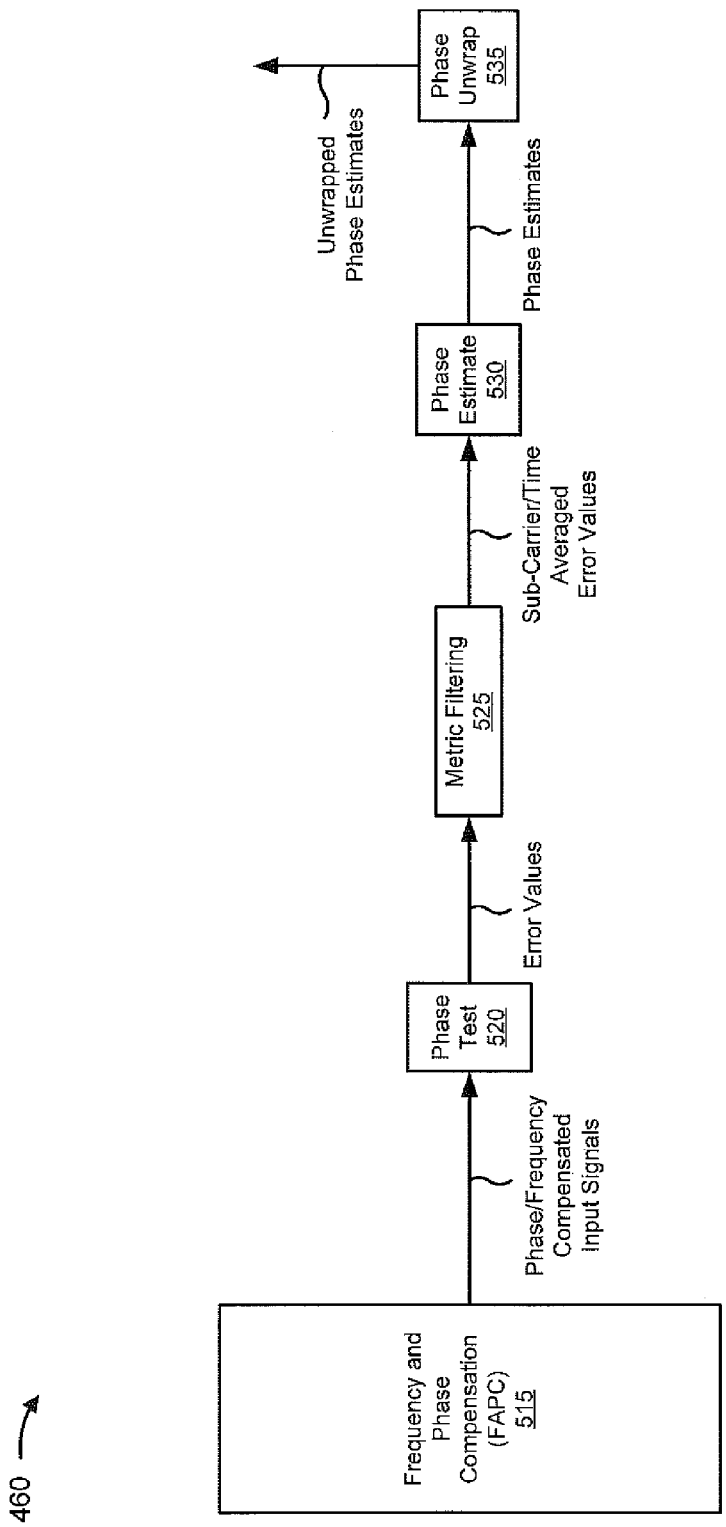

FIGS. 5A and 5B are diagrams of example components of carrier recovery component 460 shown in FIG. 4. As shown in FIG. 5A, carrier recovery component 460 may include a first-in first-out delay component (FIFO Delay) 505, a multiplier component 510, a frequency and phase compensation component (FAPC) 515, a phase test component 520, a metric filtering component 525, a phase estimate component 530, a phase unwrap component 535, another FIFO Delay component 540, an adder component 545, a lookup table component (LUT) 550, a frequency estimate component 555, and a phase difference estimate component 560.

Carrier recovery component (CRC) 460 may receive an input signal (e.g. from the output of an equalizer), and may pass the input signal to FIFO Delay 505, which may delay the input signal to compensate for delay introduced by operations performed by other components of CRC 460 (e.g., components 515-550) prior to an adjustment signal being received by multiplier component 510. Multiplier component 510 may receive the input signal from FIFO Delay 505, and may adjust the input signal (e.g., via multiplication, rotation, etc.) using an adjustment signal received from LUT 550. For example, multiplier component 510 may adjust a phase of the input signal using an output phase value received from LUT 550. Multiplier component 510 may output the adjusted signal as an output signal from CRC 460, and may further output the adjusted signal to a feedback loop that includes phase difference estimate component 560.

CRC 460 may also pass the input signal to FAPC 515. Components 515-550 may operate on the input signal to determine the output phase value to be provided to multiplier 510. Components 555 and 560 may be included in a feedback loop that determines feedback signals to be used to adjust operations of components 515-550 (e.g., FAPC 515).

As shown in FIG. 5B, FAPC 515 may provide a phase and/or frequency compensated signal to phase test component 520. Phase test component 520 may apply test phases to the signal, and may determine error values based on applying the test phases. Metric filtering component 525 may receive the error values, and may average the error values over time and/or over multiple sub-carriers. Phase estimate component 530 may receive the averaged error values, and may determine one or more phase estimates for the input signals based on the averaged error values. Phase unwrap component 535 may unwrap the phase estimate values across a full phase cycle (e.g., 360 degrees), and may provide the unwrapped phase estimate as shown in FIG. 5A. Components of CRC 460 will be described in more detail elsewhere herein.

The number of components shown in FIGS. 5A and 5B is provided as an example. In practice, CRC 460 may include additional components, fewer components, different components, or differently arranged components than those shown in FIGS. 5A and 5B. Additionally, or alternatively, a set of components of CRC 460 may perform one or more functions described as being performed by another set of components of CRC 460.

Figure 6:
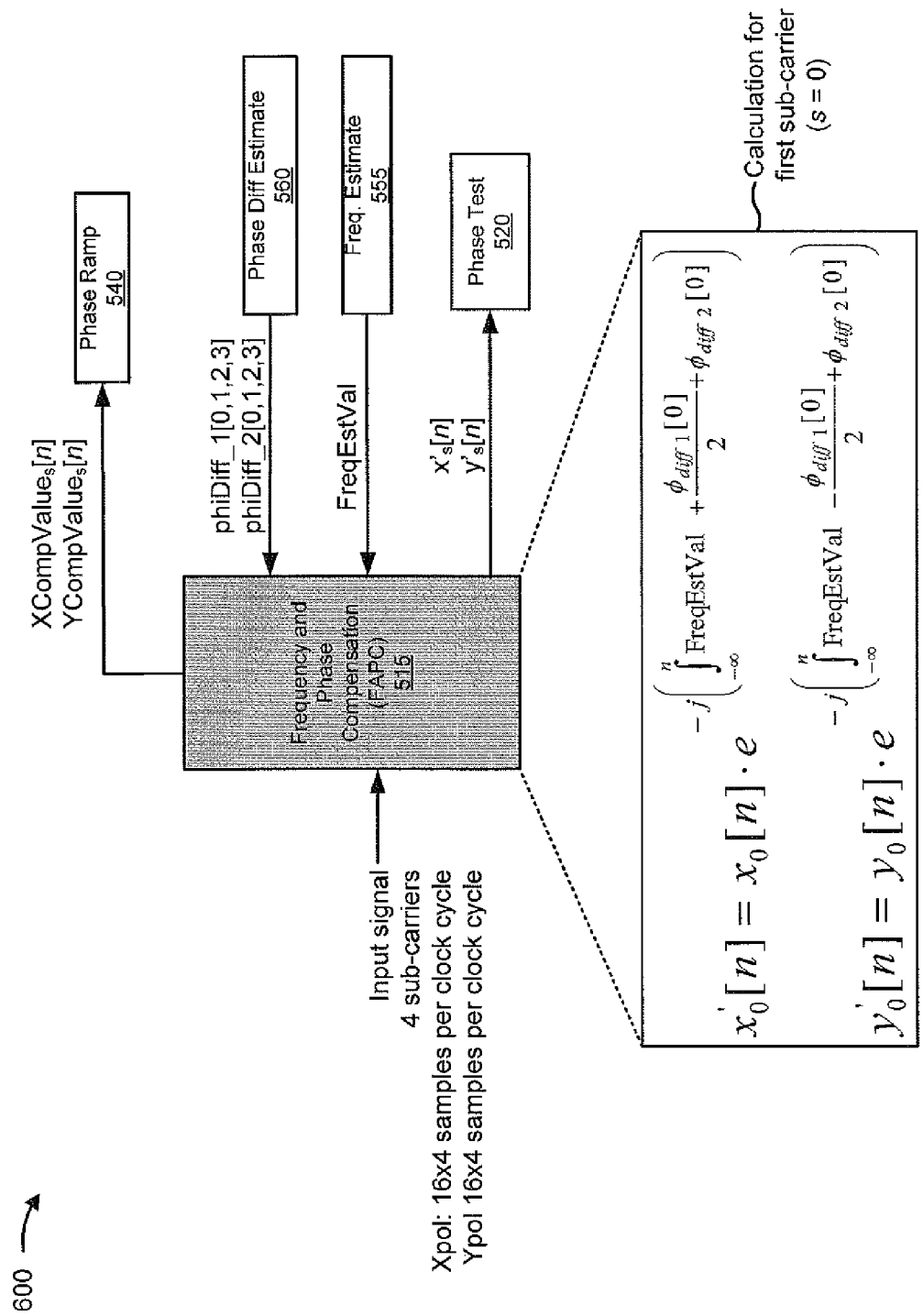
FIGS. 6-8, 9A, 9B, 10-12, and 13A-13D are diagrams of example implementations relating to operations performed by components of the carrier recovery component shown in FIGS. 5A and 5B.

FIG. 6 is a diagram of an example implementation 600 relating to operations performed by frequency and phase compensation component (FAPC) 515. As shown in FIG. 6, FAPC 515 may receive an input signal (e.g., a digital sample, a digital signal, etc.). In example implementation 600, FAPC 515 is shown as receiving 16 samples, on each of 4 sub-carriers that each have two polarizations (e.g., Xpol and Ypol), per clock cycle. Thus, FAPC 515 receives 64 samples on the X polarization (e.g., 16 samples×4 sub-carriers carrying data on the X polarization) and 64 samples on the Y polarization (e.g., 16 samples×4 sub-carriers carrying data on the Y polarization), for a total of 128 samples per clock cycle. Each sample may include a symbol (e.g., with a phase value and an amplitude value).

In some implementations, FAPC 515 may compensate the frequency of the input signal(s) using a frequency estimate value (FreqEstVal) received from frequency estimate component (FE) 555, determined as described elsewhere herein.

Additionally, or alternatively, FAPC 515 may compensate a phase difference between the X polarization and the Y polarization for each sub-carrier using a first phase difference value (phiDiff_1, or ($\Phi_{diff1}$)) received from PDE 560, determined as described elsewhere herein. In some implementations, the quantity of phiDiff_1 values received from PDE 560 may correspond to the quantity of sub-carriers. For example, PDE 560 is shown as providing four phiDiff_1 values to FAPC 515 (e.g., phiDiff_1[0], phiDiff_1[1], phiDiff_1[2], and phiDiff_1[3]), where the values of 0-3 correspond to the 4 sub-carriers of example implementation 600.

Additionally, or alternatively, FAPC 515 may compensate a phase difference between different sub-carriers using a second phase difference value (phiDiff_2, or $\Phi_{diff2}$) received from PDE 560, determined as described elsewhere herein. In some implementations, the quantity of phiDiff_2 values received from PDE 560 may correspond to the quantity of sub-carriers. For example, PDE 560 is shown as providing four phiDiff_2 values to FAPC 515 (e.g., phiDiff_2[0], phiDiff_2[1], phiDiff_2[2], and phiDiff_2[3]), where the values of 0-3 correspond to the 4 sub-carriers of example implementation 600.

For each sub-carrier s, FAPC 515 may compensate a sample received via the sub-carrier, based on input received from FE 555 and PDE 560, as follows:

$$x'_s[n] = x_s[n] \times e^{-j[XCompValue_s[n]]}$$

$$y'_s[n] = y_s[n] \times e^{-j[YCompValue_s[n]]}$$

In the above equations, $x'_s[n]$ and $y'_s[n]$ may represent the frequency and phase compensated symbols, for the $n^{th}$ sample (or at time n) of sub-carrier s, calculated by FAPC 515 for the X polarization and the Y polarization, respectively. Furthermore, $x_s[n]$ and $y_s[n]$ may represent the input symbols before adjustment, e may represent Euler's number (e.g., the mathematical constant e≈2.71828), j may represent the imaginary component of the sample (e.g., the square root of −1), and $XCompValue_s[n]$ and $YCompValue_s[n]$ may represent X polarization and Y polarization compensation values, respectively, to be applied to the input symbols by FAPC 515. In some implementations, $XCompValue_s[n]$ and $YCompValue_s[n]$ may be represented as follows:

$$XCompValue_s[n] = \left( \int_{-\infty}^{n} FreqEstVal \right) + \frac{\phi_{diff1}[s]}{2} + \phi_{diff2}[s]$$

$$YCompValue_s[n] = \left( \int_{-\infty}^{n} FreqEstVal \right) - \frac{\phi_{diff1}[s]}{2} + \phi_{diff2}[s]$$

In the above equations, FreqEstVal may represent the frequency estimate value received from FE 555, $\Phi_{diff1}$ may represent the first phase difference value received from PDE 560, and $\Phi_{diff2}$ may represent the second phase difference value received from PDE 560. As used herein, a frequency compensation value may refer to the frequency estimate value (FreqEstVal), an integral of the frequency estimate value (e.g., from $n_{initial}$ to $n_{final}$, such as from negative infinity to n), or the like. As used herein, a phase compensation value may refer to the first phase difference value (e.g., $\Phi_{diff1}$), the second phase difference value (e.g., $\Phi_{diff2}$), a mathematical combination of the first phase difference value and the second phase difference value (e.g., $$\left(e.g., \frac{\phi_{diff1}[s]}{2} + \phi_{diff2}[s]\right),$$

or the like.

As shown in FIG. 6, FAPC 515 may provide $x'_s[n]$ and $y'_s[n]$ to phase test component 520. FAPC 515 may calculate these symbols for every sub-carrier s, and for every input sample n. As further shown in FIG. 6, FAPC 515 may provide XCompValue$_s$[n] and YCompValue$_s$[n] to phase ramp component 540.

As indicated above, FIG. 6 is provided merely as an example. Other examples are possible and may differ from what was described with regard to FIG. 6. For example, FAPC 515 may perform additional operations, fewer operations, or different operations than those described in connection with FIG. 6.

Figure 7:
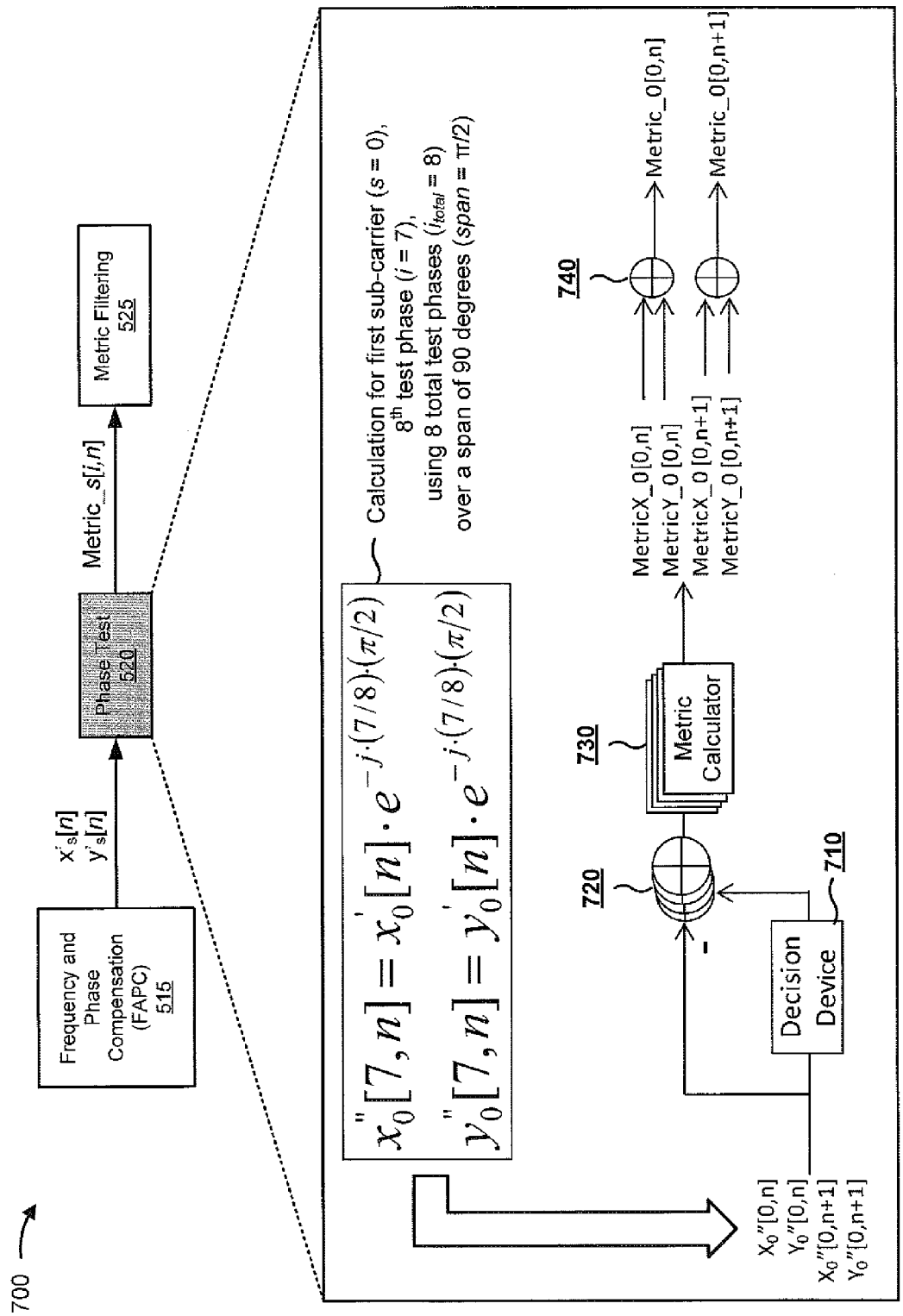

FIG. 7 is a diagram of an example implementation 700 relating to operations performed by phase test component (PT) 520. As described herein in connection with FIG. 6, PT 520 may receive phase and frequency compensated symbols $x'_s[n]$ and $y'_s[n]$ from FAPC 515. PT 520 may apply test phases to each received symbol (sample), and may calculate an error value associated with each test phase. The quantity of test phases and the span of the test phases may be configurable. As an example, assume that PT 520 uses 8 test phases. When performing carrier recovery for modulation formats that have 90 degree phase symmetry, PT 520 may use test phases that span 90 degrees. For example, when using 8 test phases that span 90 degrees, PT 520 may evenly space the test phases by using values of 0° (or 90°), 11.25°, 22.5°, 33.75°, 45°, 56.25°, 67.5°, and 78.75°. As another example, when using 8 test phases that span 180 degrees, PT 520 may evenly space the test phases by using values of 0° (or 180°), 22.5°, 45°, 67.5°, 90°, 112.5°, 135°, and 157.5°.

PT 520 may apply a test phase to a received sample as follows:

$$x''_s[i, n] = x'_s[n] \times e^{-j \times \left(\frac{i}{i_{total}}\right) \times (span)}$$

$$y''_s[i, n] = y'_s[n] \times e^{-j \times \left(\frac{i}{i_{total}}\right) \times (span)}$$

In the above equations, $x''_s[i,n]$ and $y''_s[i,n]$ may represent the test phase compensated symbols, for the $n^{th}$ sample (or at time n) of sub-carrier s when test phase i is applied, calculated by PT 520 for the X polarization and the Y polarization, respectively. Furthermore, $x'_s[n]$ and $y'_s[n]$ may represent the phase and frequency compensated symbols received from FAPC 515, e may represent Euler's number, j may represent the imaginary component of the sample, $i_{total}$ may represent the total quantity of test phases, and span may represent the span of the test phases. As an example, using 8 test phases that span 90 degrees, PT 520 may set span equal to $\pi/2$ radians (e.g., 90 degrees), and may set $i/i_{total}$ equal to 0/8 for the first test phase (e.g., test phase 0), to ⅛ for the second test phase (e.g., test phase 1), etc., and to ⅞ for the last test phase (e.g., test phase 7, where the 8 test phases are identified as test phases 0 through 7). Thus, every input sample, for a particular sub-carrier and polarization, will result in eight output samples (e.g., one for each test phase).

As further shown in FIG. 7, one or more test phase compensated symbols for each polarization may be provided to a decision device 710. Decision device 710 may determine, for each input symbol, a symbol in the constellation diagram with which the input symbol is most likely to correspond. For example, decision device 710 may use a maximum likelihood estimation (e.g., by determining the minimum Euclidean distance between the input symbol and a symbol in the constellation diagram). Decision device 710 may be configured based on a modulation format of the signal (e.g., QPSK, Block-4D-BPSK, 3QAM, 16QAM, etc.).

In some implementations, decision device 710 may use two or more consecutive samples (e.g., n, n+1) to determine a most likely symbol (e.g., when the modulation format is Block-4D-BPSK). PT 520 may input the test phase compensated symbol and the most likely symbol into a subtractor 720. Subtractor 720 may determine a difference between the test phase compensated symbol and the most likely symbol, and may provide the difference to a metric calculator 730.

Metric calculator 730 may calculate an error value based on the difference. For example, metric calculator 730 may calculate a power of the error (e.g., a power of the difference), such as by squaring a difference of an in-phase component of the symbol (e.g., I), by squaring a difference of a quadrature component of the symbol (Q), and by summing the squares (e.g., $I^2+Q^2$). Metric calculator 730 may calculate a first error value for the X polarization and a second error value for the Y polarization. The error values calculated by metric calculator 730 for sub-carrier s and sample n using test phase i may be represented as MetricX_s[i,n] for the X polarization, and MetricY_s[i,n] for the Y polarization.

As further shown in FIG. 7, PT 520 may provide the X and Y error values to an adder 740. Adder 740 may combine the X and Y error values, for a particular sub-carrier s, test phase i, and sample n, to generate a combined error value for the particular sub-carrier s, test phase i, and sample n. The combined error value may be represented as Metric_s[i,n] (e.g., which may represent a sum of MetricX_s[i,n] and MetricY_s[i,n]). By combining the X and Y error values, adder 740 may reduce noise on the combined metric value. PT 520 may provide Metric_s[i,n] to metric filtering component 525.

As indicated above, FIG. 7 is provided merely as an example. Other examples are possible and may differ from what was described with regard to FIG. 7. For example, PT 520 may perform additional operations, fewer operations, or different operations than those described in connection with FIG. 7.

Figure 8:
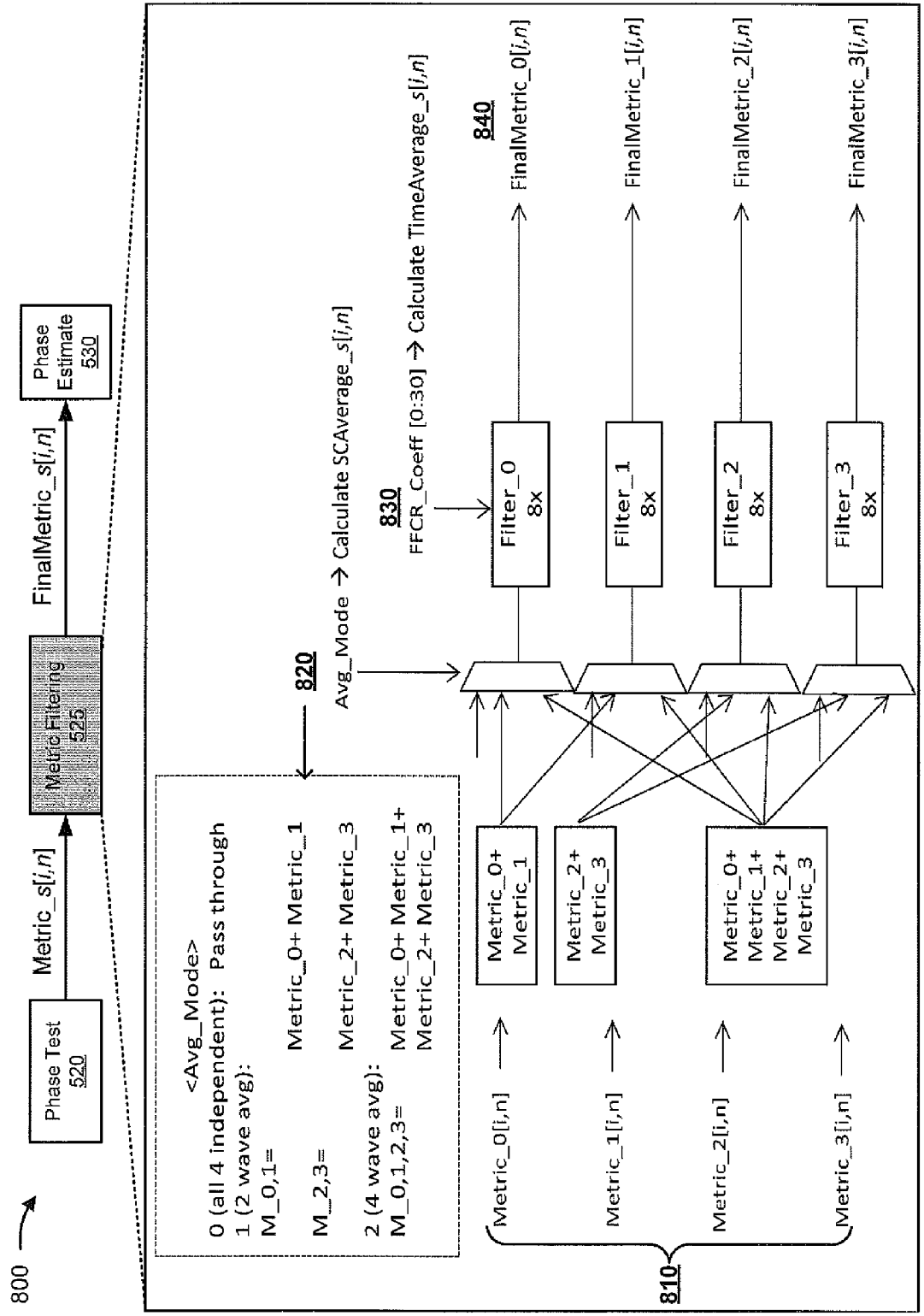

FIG. 8 is a diagram of an example implementation 800 relating to operations performed by phase metric filtering component (MF) 525. As described herein in connection with FIG. 7, MF 525 may receive combined metric values (e.g., Metric_s[i,n]) from PT 520. MF 525 may average combined metric values across multiple sub-carriers to generate a sub-carrier-averaged metric value for a particular sub-carrier s, test phase i, and sample n. Additionally, or alternatively, MF 525 may average combined metric values over time to generate a time-averaged metric value for a particular sub-carrier s, test phase i, and sample n. MF 525 may calculate the sub-carrier-averaged metric value and/or the time-averaged metric value to reduce an amount of noise in the metric value.

As an example, and as shown in FIG. 8, assume that an optical channel is divided into four subcarriers, labeled 0, 1, 2, and 3. As shown by reference number 810, assume that MF 525 receives a combined metric value Metric_s[i,n] for each of the four sub-carriers (e.g., Metric_0[i,n], Metric_1[i,n], Metric_2[i,n], and Metric_3[i,n]). As shown by reference number 820, MF 525 may use an Avg_Mode indicator value to determine whether to calculate a sub-carrier-averaged metric value using multiple metric values for multiple respective sub-carriers (e.g., for a particular test phase and sample). For example, if the Avg_Mode value is equal to a first value (e.g., 0), then MF 525 may not calculate a sub-carrier-averaged metric value.

As another example, if the Avg_Mode value is equal to a second value (e.g., 1), then MF 525 may calculate a sub-carrier-averaged metric value (e.g., SCAverage) using metric values from two different sub-carriers. For example, MF 525 may calculate SCAverage_0[i,n] and SCAverage_1[i,n] by averaging Metric_0[i,n] and Metric_1[i,n]. Similarly, MF 525 may calculate SCAverage_2[i,n] and SCAverage_3[i,n] by averaging Metric_2[i,n] and Metric_3[i,n]. In some implementations, MF 525 may average other combinations of metric values (e.g., by averaging Metric_0 and Metric_2, Metric_0 and Metric_3, etc.)

As another example, if the Avg_Mode value is equal to a third value (e.g., 2), then MF 525 may calculate the sub-carrier-averaged metric value using metric values from four different sub-carriers. For example, MF 525 may calculate SCAverage_0[i,n]. SCAverage_1[i,n], SCAverage_2[i,n], and SCAverage_3[i,n] by averaging Metric_0[i,n], Metric_1[i,n], Metric_2[i,n], and Metric_3[i,n].

In some implementations, Avg_Mode may be a different value than described above, and MF 525 may calculate the sub-carrier-averaged metric value using metric values for different quantities (e.g., 3, 5, etc.) of sub-carriers and/or may combine metric values for different combinations of sub-carriers. In some implementations, the value of Avg_Mode may be configurable (e.g., based on user input, based on a modulation format, based on a quantity of sub-carriers, etc.).

As shown by reference number 830, MF 525 may use an FFCR_Coeff[$n_{start}$,$n_{end}$] value to calculate a time-averaged metric value (e.g., TimeAverage_s[i,n]) using multiple metric values for multiple respective samples (e.g., for a particular test phase and sub-carrier). For example, MF 525 may calculate a time-averaged metric value over a particular quantity of samples (e.g., from $n_{start}$ to $n_{end}$). Additionally, or alternatively, MF 525 may calculate a time-weighted average (e.g., with more recent samples being weighted more heavily than less recent samples), or may use another averaging technique to calculate the time-averaged metric value.

As shown by reference number 840, MF 525 may generate and provide a final metric value, FinalMetric_s[i,n], to phase estimate component 530. In some implementations, the final metric value may be equal to the combined metric value (e.g., Metric_s[i,n]) received from PT 520. In some implementations, the final metric value may include a sub-carrier-averaged metric value (e.g., SCAverage_s[i,n]). In some implementations, the final metric value may include a time-averaged metric value (e.g., TimeAverage_s[i,n]). In some implementations, the final metric value may include a combination of sub-carrier-averaged metric values and time-averaged metric values. In this case, the time averaging and the sub-carrier averaging may be performed in any order.

As an example, MF 525 may calculate multiple sub-carrier-averaged metric values, for a particular sample, by averaging metric values for the particular sample over multiple sub-carriers. MF 525 may then calculate a time-averaged metric value, for the particular sample, by averaging multiple sub-carrier-averaged metric values over multiple samples.

As indicated above, FIG. 8 is provided merely as an example. Other examples are possible and may differ from what was described with regard to FIG. 8. For example, MF 525 may perform additional operations, fewer operations, or different operations than those described in connection with FIG. 8.

Figure 9A:
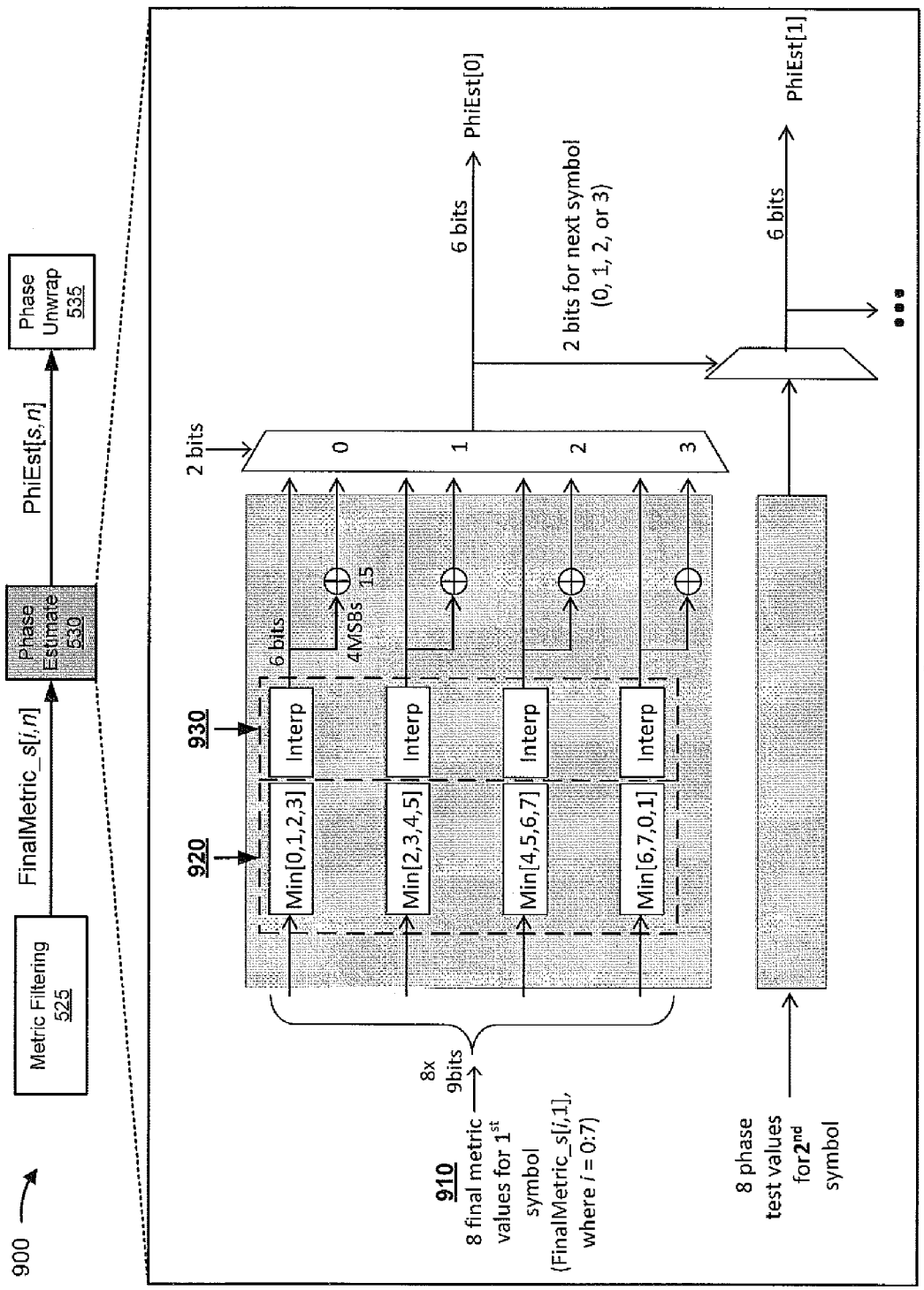
Figure 9B:
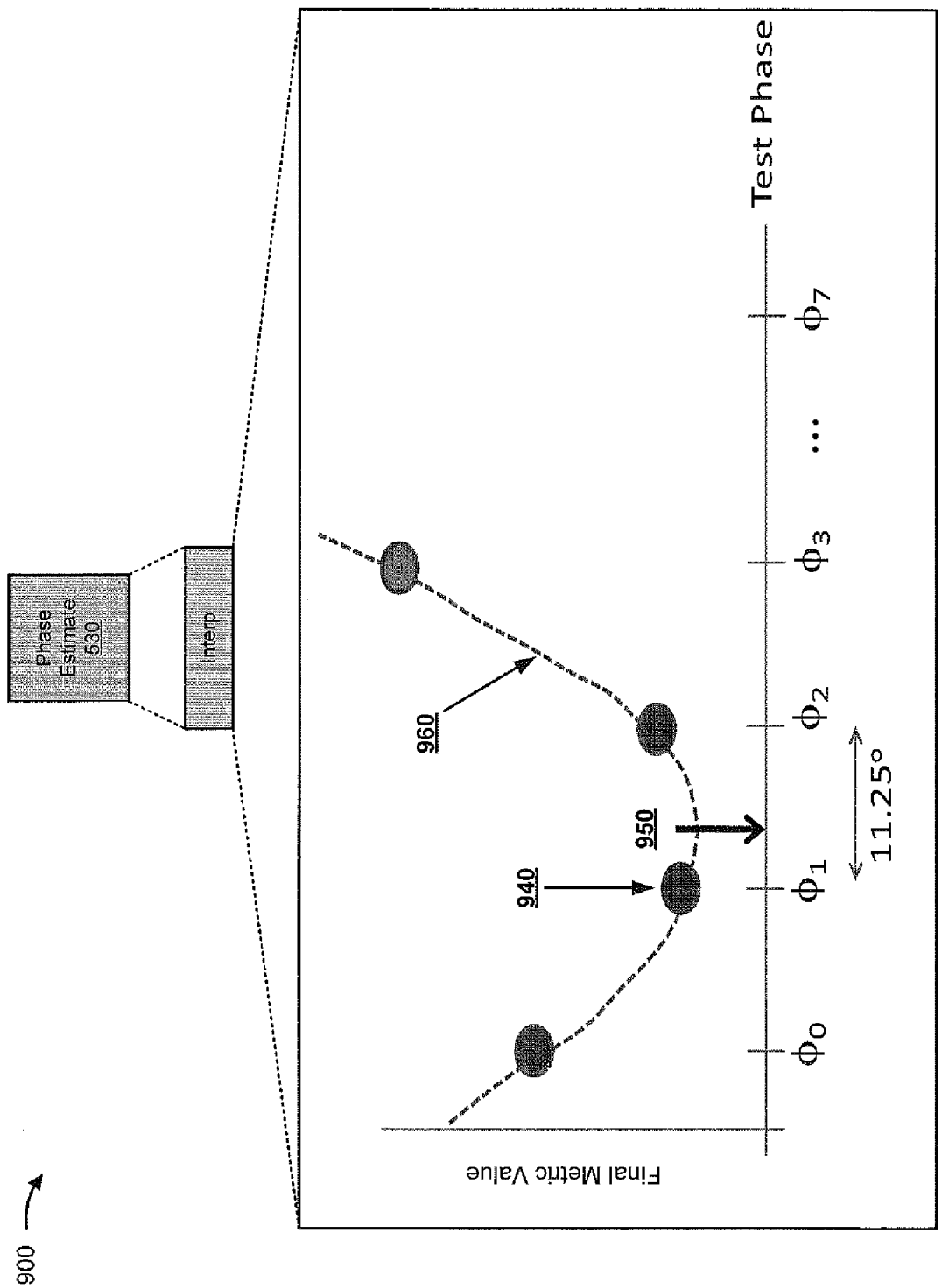

FIGS. 9A and 9B are diagrams of an example implementation 900 relating to operations performed by phase estimate component (PE) 530. As described herein in connection with FIG. 8, PE 530 may receive final metric values (e.g., FinalMetric_s[i,n]) from MF 525. PE 530 may determine a phase estimate (e.g., a most likely phase for a received symbol), for a particular sub-carrier s and sample n, using all of the final metric values FinalMetric_s[i,n] for each test phase i.

PE 530 may calculate a phase estimate PhiEst[s,n] for a first symbol (e.g., a first received symbol) by determining a minimum final metric value among all final metric values for different test phases applied to the first symbol. PE 530 may set the value of PhiEst[s,n] equal to the test phase value associated with the minimum final metric value. For example, PE 530 may determine the phase estimate PhiEst[s,0] for a first symbol n=0, where there are 8 test phases, by calculating the following:

$$\min_{i:0\to 7} \{\text{FianlMetric\_s}[i, 0]\}$$

PE 530 may then set the value of PhiEst[s,0] equal to the phase value of test phase i associated with the minimum final metric value. For example, when using 8 test phases that span 90 degrees, i={0, 1, 2, 3, 4, 5, 6, 7} may correspond to test phase values of {0°, 11.25°, 22.5°, 33.75°, 45°, 56.25°, 67.5°, 78.75°}. Thus, if i=2 generated the minimum metric value (e.g., FinalMetric_s[2,0]), then PE 530 may set PhiEst[s,0] equal to 22.5°.

For the second symbol (e.g., n=1), PE 530 may determine a minimum of fewer than all of the final metric values for the different test phases applied to the second symbol. For example, to calculate PhiEst[s,1], PE 530 may determine a minimum of four final metric values that center around PhiEst[s,0] (e.g., half of the eight total final metric values corresponding to the eight test phases). This avoids the issue of two minimum values discussed above in connection with FIGS. 1A and 1B. PE 530 may continue to determine phase estimate values in this manner, by calculating PhiEst[s,n+1] by determining a minimum of final metric values centered around PhiEst[s,n].

In some implementations, PE 530 may determine an interpolated phase estimate value to update PhiEst[s,n]. For example, PE 530 may interpolate PhiEst[s,n] using a quantity of final metric values centered around PhiEst[s,n].

As shown in FIG. 9A, and by reference number 910, assume that PE 530 receives eight final metric values associated with eight test phase values for a first symbol on a first sub-carrier. As shown by reference number 920, PE 530 may determine a minimum final metric value of four final metric values associated with four consecutive test phases, such as a minimum final metric value associated with test phase 0, 1, 2, or 3 (e.g., Min[0,1,2,3]), a minimum final metric value associated with test phase 2, 3, 4, or 5 (e.g., Min[2,3,4,5]), a minimum final metric value associated with test phase 4, 5, 6, or 7 (e.g., Min[4,5,6,7]), and a minimum final metric value associated with test phase 6, 7, 0, or 1 (e.g., Min[6,7,0,1]).

Note that each of these calculations is centered around a different pair of test phases (e.g., 1-2, 3-4, 5-6, and 7-0).

As shown by reference number 930, once PE 530 determines a minimum final metric value from each group of four test phases, PE 530 may perform an interpolation (e.g., a parabolic interpolation) to estimate an interpolated phase value that corresponds to an actual minimum final metric value, as described in more detail in connection with FIG. 9B. PE 530 may compare the four interpolated phase values (e.g., one from each group of four test phases) to determine which one corresponds to a minimum final metric value, and may select the interpolated phase value that corresponds to the minimum final metric value as PhiEst[s,0]. PE 530 may provide PhiEst[s,n] to phase unwrap component 535.

Additionally, or alternatively, PE 530 may calculate a group indicator value (e.g., a two bit value of 0, 1, 2, or 3) to be used to select an interpolated phase value for the next symbol (e.g., to select a value for PhiEst[s,1]). For example, the output of the interpolation may be a six bit value, and PE 530 may provide the four most significant bits (MSBs) to an adder that combines the four MSBs with a value of 15 to produce a group indicator value of 0, 1, 2, or 3. When selecting PhiEst[s,n+1], PE 530 may use the group indicator value to select from the four interpolated phase values. For example, PE 530 may select the interpolated phase value determined from Min[0,1,2,3] when the group indicator value is equal to 0, may select the interpolated phase value determined from Min[2,3,4,5] when the group indicator value is equal to 1, may select the interpolated phase value determined from Min[4,5,6,7] when the group indicator value is equal to 2, and may select the interpolated phase value determined from Min[6,7,0,1] when the group indicator value is equal to 3. In this way, PE 530 may avoid the issue of selecting between two minimum values, as discussed above in connection with FIGS. 1A and 1B.

As shown in FIG. 9B, PE 530 may perform an interpolation (e.g., a parabolic interpolation) to estimate an interpolated phase value that corresponds to an actual minimum final metric value. FIG. 9B shows a plot of test phases 0, 1, 2, and 3, shown as $\Phi_0$, $\Phi_1$, $\Phi_2$, and $\Phi_3$ (e.g., corresponding to 0°, 11.25°, 22.5°, and 33.75°, respectively), and a corresponding final metric value associated with each test phase. This plot may correspond to an interpolation performed after determining Min[0,1,2,3], shown in FIG. 9A.

As shown by reference number 940, assume that test phase 1 corresponds to a minimum final metric value, as compared to test phases 0, 2, and 3. However, as shown by reference number 950, the actual minimum final metric value is associated with a phase value somewhere between the phase values of test phases 1 and 2 (e.g., between 11.25° and 22.5°). PE 530 may use multiple test phase values and the corresponding final metric values to interpolate a function that relates a phase value to a final metric value, as shown by reference number 960. As an example, PE 530 may use the test phase associated with the minimum final metric value (e.g., $\Phi_1$) and the two test phases on either side of that test phase (e.g., $\Phi_0$ and $\Phi_2$), to interpolate the function. As another example, PE 530 may use all four test phase values and the corresponding final metric values to interpolate the function. PE 530 may use the function to determine an interpolated phase value that corresponds to the minimum final metric value of the function.

As indicated above, FIGS. 9A and 9B are provided merely as an example. Other examples are possible and may differ from what was described with regard to FIGS. 9A and 9B. For example, PE 530 may perform additional operations, fewer operations, or different operations than those described in connection with FIGS. 9A and 9B.

Figure 10:
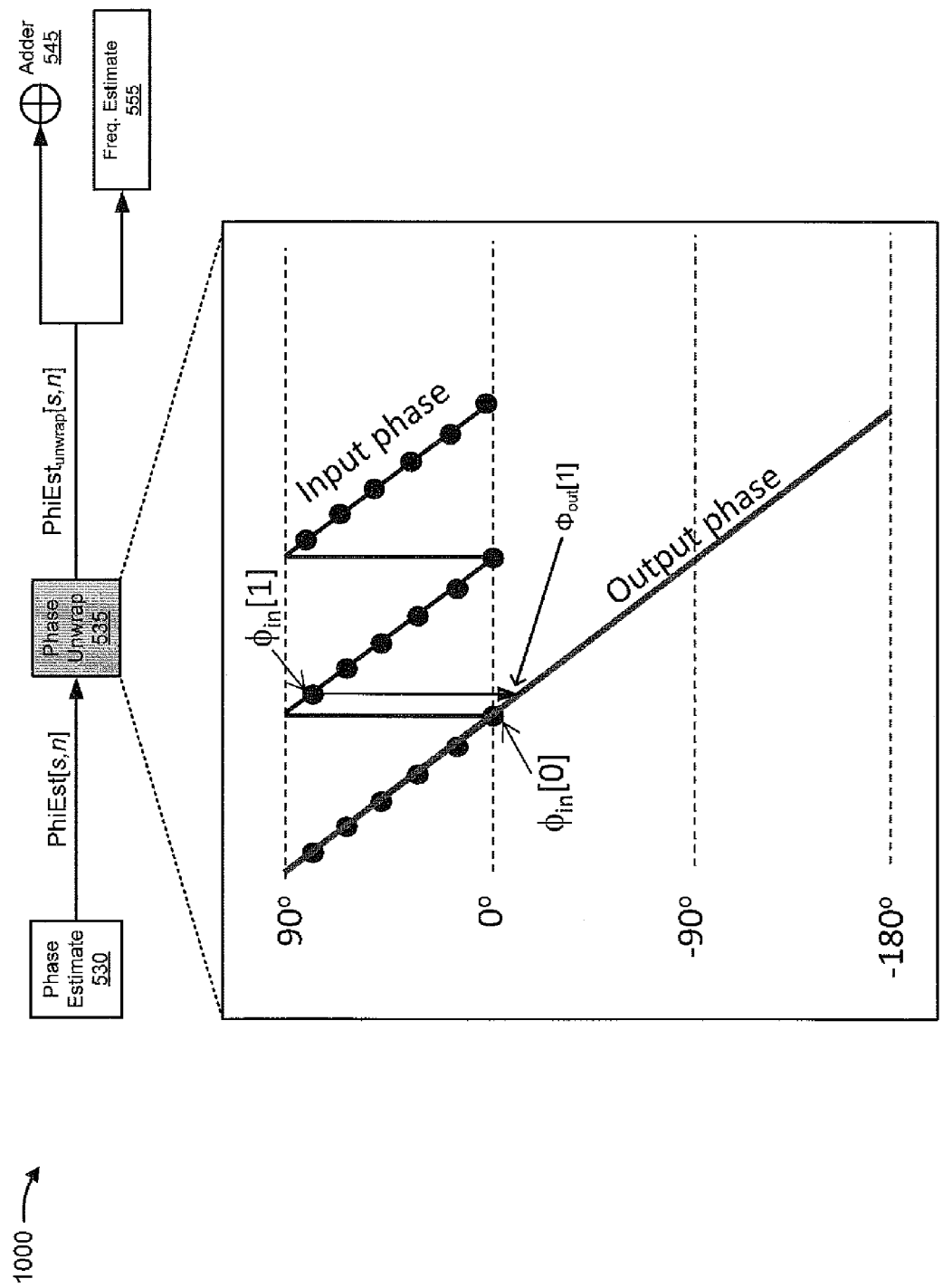

FIG. 10 is a diagram of an example implementation 1000 relating to operations performed by phase unwrap component (PU) 535. As described herein in connection with FIGS. 9A and 9B, PU 535 may receive a phase estimate value PhiEst[s,n] from PE 530. The value of PhiEst[s,n] may include a value between 0° and 90° for a modulation format with 90 degree symmetry, a value between 0° and 180° for a modulation format with 180 degree symmetry, etc. However, the actual phase value of a symbol may include a value between 0° and 360°. PU 535 may convert a received phase estimate value (e.g., PhiEst[s,n]) to an unwrapped phase estimate value (e.g., $PhiEst_{unwrap}[s,n]$) between 0° and 360°.

PU 535 may determine the actual phase value by calculating a phase difference between consecutively-received phase estimate values, such as a first phase estimate value PhiEst[s,n] and a second phase estimate value PhiEst[s,n+1]). PU 535 may subtract the first phase estimate value from the second phase estimate value. If the result is less than a first threshold value, then PU 535 may add a value equal to the span of the test phases (e.g., 90 degrees, 180 degrees, etc.) to the second phase estimate value. If the result is greater than a second threshold value, then PU 535 may subtract a value equal to the span of the test phases from the second phase estimate value. PU 535 may provide the resulting unwrapped phase estimate value $PhiEst_{unwrap}[s,n]$ to adder 545 and frequency estimate component 555.

As an example, and as shown in FIG. 10, assume that PhiEst[s,0], shown in FIG. 10 as $\Phi_{in}[0]$, is equal to 0°, and that PhiEst[s,1], shown in FIG. 10 as $\Phi_{in}[1]$, is equal to 85°. Assume that PU 535 determines that $\Phi_{in}[1]-\Phi_{in}[0]$ is equal to a result of 85°, which is greater than a threshold value of 45° (e.g., half the distance between 0° and a positive span of 90°). Thus, PU 535 calculates $PhiEst_{unwrap}[s,1]$, shown in FIG. 10 as $\Phi_{in}[1]$, as $\Phi_{in}[1]-90°=-5°$.

As another example, assume that $\Phi_{in}[0]$ is equal to 90°, and that $\Phi_{in}[1]$ is equal to 5°. Assume that PU 535 determines that $\Phi_{in}[1]-\Phi_{in}[0]$ is equal to a result of −85°, which is less than a threshold value of −45° (e.g., half the distance between 0° and a negative span of)−90°. Thus, PU 535 calculates $\Phi_{out}[1]=\Phi_{in}[1]+90°=95°$. In this way, PU 535 may unwrap received phase values along a full phase cycle of 360°.

As indicated above, FIG. 10 is provided merely as an example. Other examples are possible and may differ from what was described with regard to FIG. 10. For example, PU 535 may perform additional operations, fewer operations, or different operations than those described in connection with FIG. 10.

Figure 11:
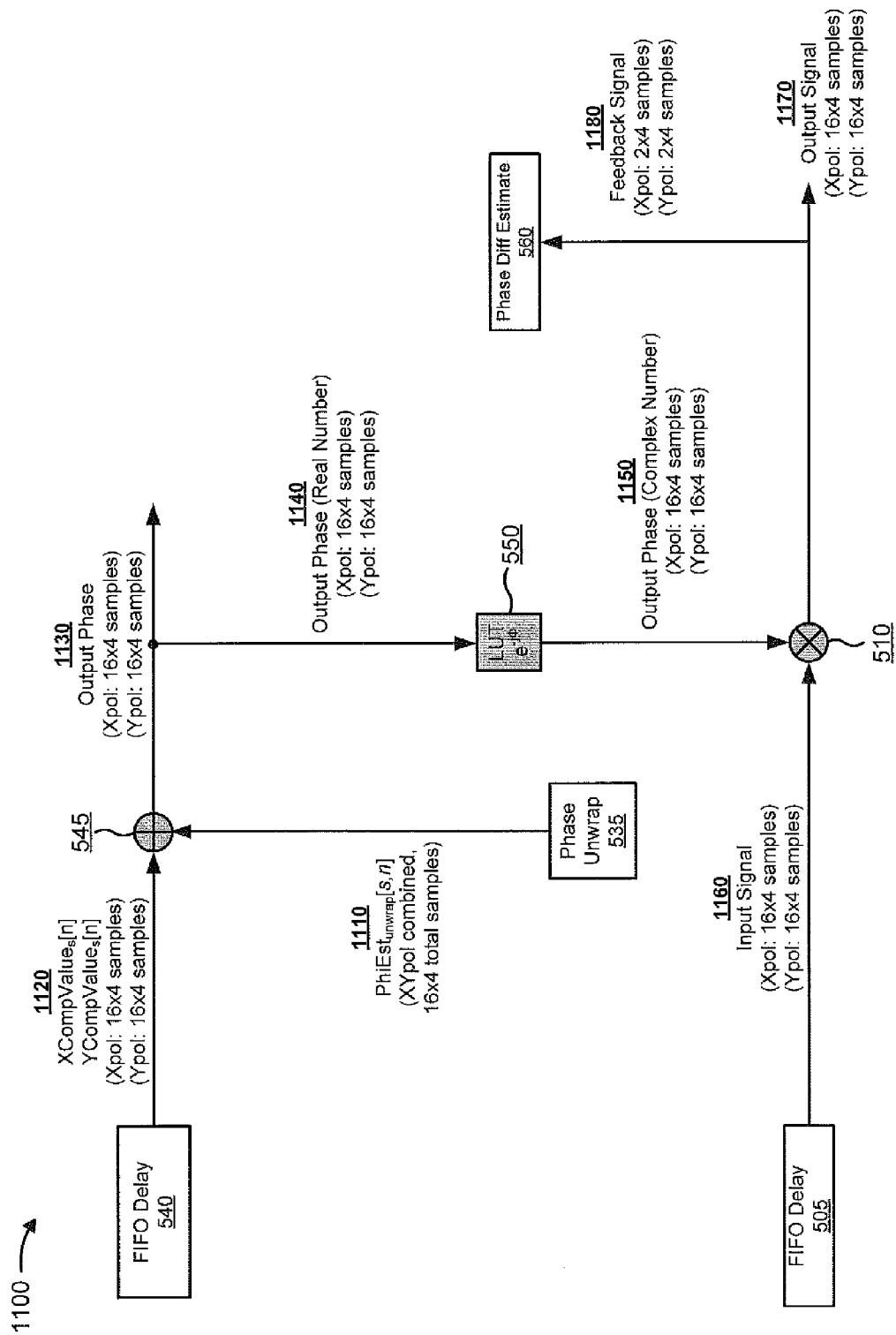

FIG. 11 is a diagram of an example implementation 1100 relating to operations performed by adder 545, lookup table component (LUT) 550, and multiplier 510. As described herein in connection with FIG. 10, and as shown by reference number 1110, adder 545 may receive an unwrapped phase estimate value $PhiEst_{unwrap}[s,n]$ from PU 535. The unwrapped phase estimate value may be a value that combines information determined based on the X polarization and the Y polarization. In example implementation 1100, assume that CRC 460 processes 16 samples per clock cycle, and that an optical channel that provides input to CRC 460 includes 4 sub-carriers.

As shown by reference number 1120, adder 545 may also receive a phase and frequency compensation value from FIFO Delay 540. For example, adder 545 may receive a phase and frequency compensation value for the X polarization (e.g., $XCompValue_s[n]$) and a phase and frequency compensation value for the Y polarization (e.g., $YCompValue_s[n]$). FIFO Delay 540 may delay providing the compensation values to adder 545 to coincide with the unwrapped phase estimate value being provided to adder 545. In this way, adder 545 may properly combine the compensation values and the unwrapped phase estimate value (e.g., with appropriate timing). As shown by reference number 1130, adder 545 may combine (e.g., may sum) each phase and frequency compensation value with the phase estimate value to determine an output phase for each polarization (e.g., XCompValue$_s$[n]+PhiEst$_{unwrap}$[s,n] for the X polarization, and YCompValue$_s$[n]+PhiEst$_{unwrap}$[s,n] for the Y polarization). The output phases may be represented using a real number.

As shown by reference number 1140, LUT 550 may receive the real number output phases, and may convert the real number output phases to complex number output phases. For example, LUT 550 may use a lookup table to perform the conversion. As shown by reference number 1150, LUT 550 may provide the complex number output phases to multiplier 510. As shown by reference number 1160, multiplier 510 may also receive an input signal from FIFO Delay 505. For example, multiplier 510 may receive an input signal for the X polarization and an input signal for the Y polarization. FIFO Delay 540 may delay providing the input signal(s) to multiplier 510 to coincide with the complex number output phase value being provided to multiplier 510. In this way, multiplier 510 may properly combine the input signals and the complex number output phase values (e.g., with appropriate timing). Multiplier 510 may combine (e.g., may multiply, rotate, etc.) each input signal value with a corresponding complex number output phase to determine a carrier-recovered output signal for each polarization.

As shown by reference number 1170, multiplier 510 may output the output signal (e.g., to a symbol decoder). Additionally, or alternatively, as shown by reference number 1180, multiplier 510 may provide a feedback signal via a feedback loop to another component of CRC 460 (e.g., PDE 560). The feedback signal may be the same as the output signal, in some implementations. In some implementations, multiplier 510 may provide the feedback signal at a different rate than the output signal. For example, multiplier 510 may generate 16 output signals per sub-carrier per clock cycle, and may generate 2 feedback signals per sub-carrier per clock cycle, as shown.

As indicated above, FIG. 11 is provided merely as an example. Other examples are possible and may differ from what was described with regard to FIG. 11. For example, adder 545, LUT 550, and/or multiplier 510 may perform additional operations, fewer operations, or different operations than those described in connection with FIG. 11.

Figure 12:
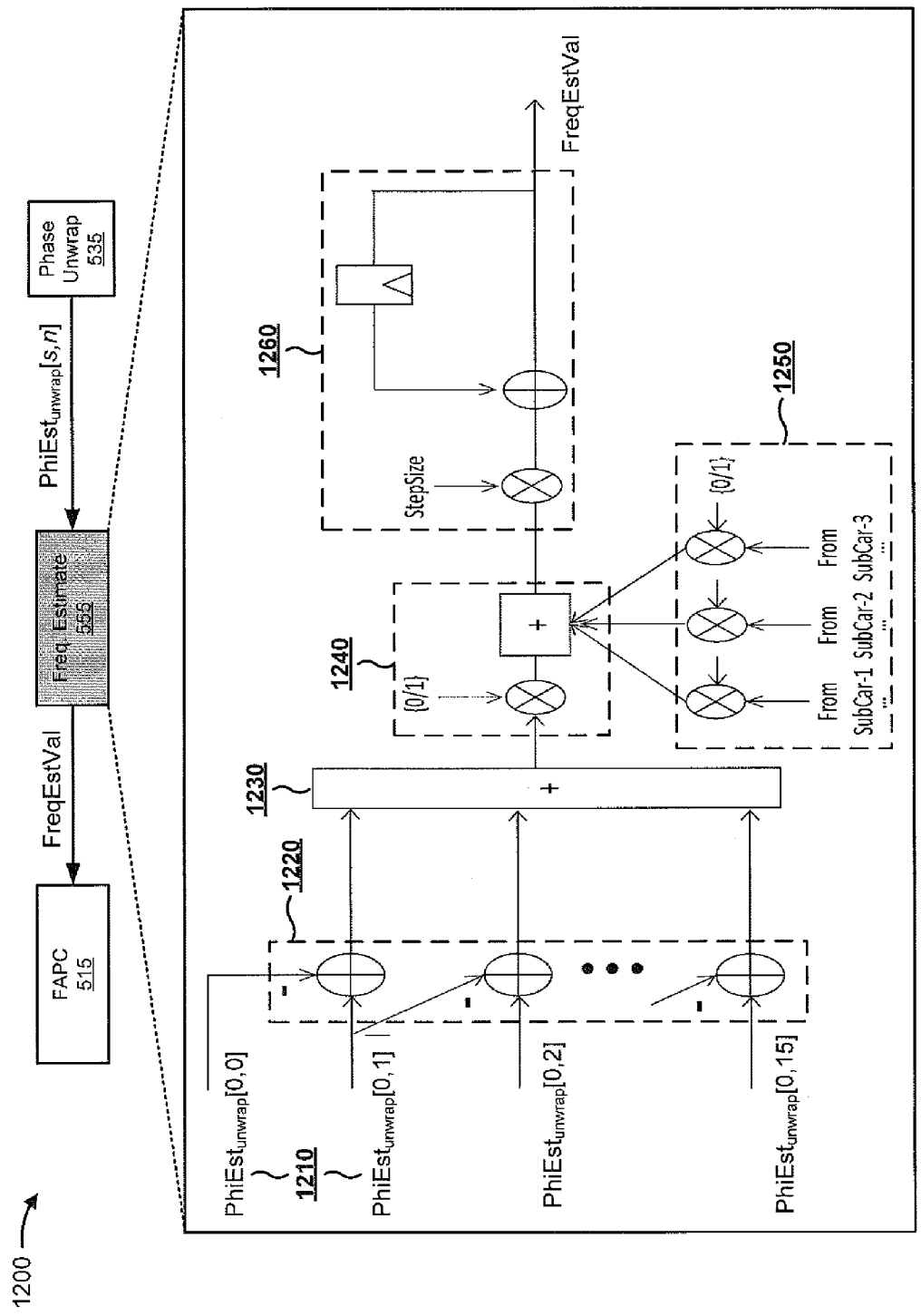

FIG. 12 is a diagram of an example implementation 1200 relating to operations performed by frequency estimate component (FE) 555. As described herein in connection with FIG. 10, FE 555 may receive a set of unwrapped phase estimate values PhiEst$_{unwrap}$[s,n] from PU 535. FE 555 may use the set of unwrapped phase estimate values to calculate a frequency estimate value FreqEstVal (e.g., to be used by FAPC 515 to compensate a frequency value of an input signal).

As an example, and as shown by reference number 1210, assume that FE 555 receives 16 samples (e.g., per clock cycle), labeled 0 through 15, on the first sub-carrier (e.g., s=0). As shown by reference number 1220, FE 555 may calculate a difference between each pair of adjacent samples (e.g., samples n={0,1}, n={1,2}, n={2,3}, ... n={14,15}). As shown by reference number 1230, FE 555 may sum all of these difference values to calculate a frequency compensation error introduced by processing performed by components 515-535.

As shown by reference number 1240, FE 555 may optionally average the frequency compensation error across multiple sub-carriers. As shown by reference number 1250, FE 555 may be configured to include or exclude a sub-carrier from the averaging operation. FE 555 may perform processing similar to that shown by reference numbers 1210-1230 for each sub-carrier, and may average the frequency compensation error across two or more sub-carriers.

As shown by reference number 1260, FE 555 may input the frequency compensation error (or the average frequency compensation error) into a digital integrator to form a first order feedback loop to control the error. FE 555 may control the feedback loop (e.g., an amount of bandwidth used by the feedback loop) using a step size value. FE 555 may output the frequency compensation error (or the average frequency compensation error) to FAPC 515 as the frequency estimate value FreqEstVal.

As indicated above, FIG. 12 is provided merely as an example. Other examples are possible and may differ from what was described with regard to FIG. 12. For example, FE 555 may perform additional operations, fewer operations, or different operations than those described in connection with FIG. 12.

Figure 13A:
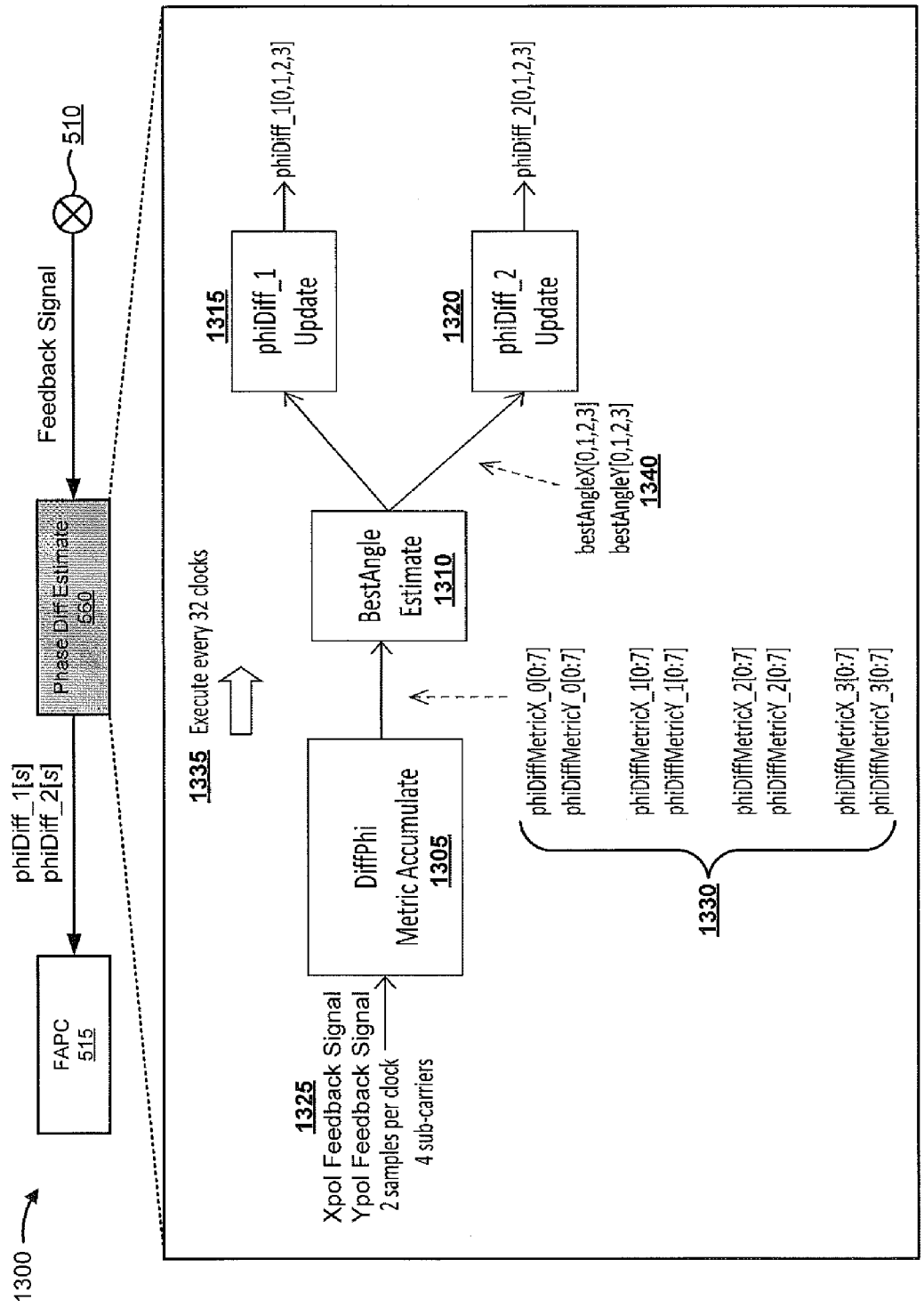

FIGS. 13A-13D are diagrams of an example implementation 1300 relating to operations performed by phase difference estimate component (PDE) 560. As described herein in connection with FIG. 11, PDE 560 may receive a set of feedback signals from multiplier 510. PDE 560 may use the set of feedback signals to calculate a set of first phase difference values, phiDiff_1[s], that represent a phase difference between the X polarization and the Y polarization for each sub-carrier s. Additionally, or alternatively, PDE 560 may use the set of feedback signals to calculate a set of second phase difference values, phiDiff_2[s], that represent a phase difference between different sub-carriers. As shown in FIG. 13A, PDE 560 may include a DiffPhi metric accumulate component (DMA) 1305, a best angle estimate component (BAE) 1310, a phiDiff_1 update component (PhiDiff1 Update) 1315, and a phiDiff_2 update component (PhiDiff2 Update) 1320.

As an example, and as shown by reference number 1325, assume that DMA 1305 receives, from multiplier 510, a feedback signal on the X polarization and a feedback signal on the Y polarization for each sub-carrier. Multiplier 510 may be configured to provide a particular quantity of signals per clock cycle (e.g., 2 samples per clock cycle). DMA 1305 may apply test phases to each received symbol on each polarization, and may calculate a metric value associated with each test phase. DMA 1305 may calculate the metric value in a similar manner as PT 520, as described elsewhere herein, except that DMA 1305 may prevent the metric value for the X polarization and the metric value for the Y polarization from being combined (e.g., DMA 1305 may perform the steps shown by reference numbers 710-730 of FIG. 7, and may not perform the step shown by reference number 740).

The outputs from DMA 1305 for the X polarization may be represented as phiDiffMetricX_s[i$_{initial}$:i$_{final}$], where s represents a sub-carrier and i represents each test phase from the first test phase i$_{initial}$ to the last test phase i$_{final}$. Similarly, the outputs from DMA 1305 for the Y polarization may be represented as phiDiffMetricY_s[i$_{initial}$:i$_{final}$]. As an example, and as shown by reference number 1330, when there are 8 test phases, DMA 1305 may output 64 metric values, with eight for each of the two polarizations on each of the four sub-carriers. As shown by reference number 1335, DMA 1305 may average each of these metric values over a particular quantity of clock cycles (e.g., 32 clock cycles). DMA 1305 may provide the metric values (or the averaged metric values) to BAE 1310.

BAE 1310 may determine the test phase that results in the minimum metric value (e.g., a most likely test phase) for a particular polarization and a particular sub-carrier. Additionally, or alternatively, BAE 1310 may perform an interpolation to determine a more accurate phase estimate value that results in a minimum metric value for the particular polarization and the particular sub-carrier. As an example, BAE 1310 may determine the minimum metric value and the interpolated phase estimate value in a manner similar to that described elsewhere herein in connection with PE 530.

The outputs from BAE 1310 for the X polarization (e.g., an interpolated phase estimate value that corresponds to a minimum metric value) may be represented as bestAngleX[s], where s represents a sub-carrier. Similarly, the outputs from BAE 1310 for the Y polarization may be represented as bestAngleY[s]. As shown by reference number 1340, when there are four sub-carriers, BAE 1310 may output 8 interpolated phase estimates, with one for each of the two polarizations and the four sub-carriers (e.g., bestAngleX[0,1,2,3] and bestAngleY[0,1,2,3]). BAE 1310 may provide the interpolated phase estimate values to PhiDiff1 Update 1315 and PhiDiff2 Update 1320 to update the values of phiDiff_1 [s] and phiDiff_2[s], as described in more detail below.

Figure 13B:
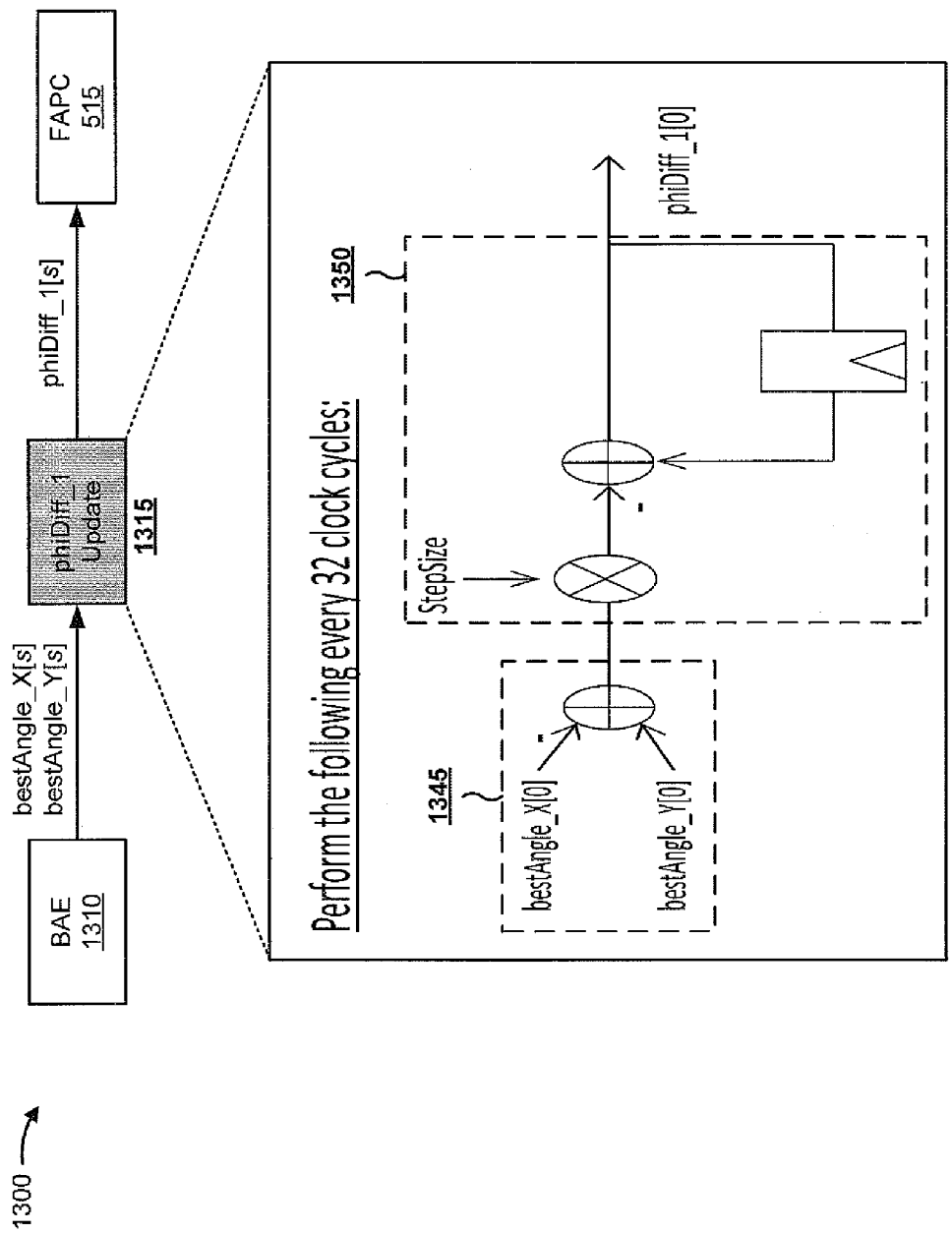

As shown in FIG. 13B, and by reference number 1345, PhiDiff1 Update 1315 may receive, for each sub-carrier, a first interpolated phase estimate value for the X polarization and a second interpolated phase estimate value for the Y polarization. As further shown, a subtractor component may determine a difference between the first and second interpolated phase estimate values for a particular sub-carrier. As shown by reference number 1350, PhiDiff1 Update 1315 may input the difference into a digital integrator to form a first order feedback loop to drive the difference toward zero. PhiDiff1 Update 1315 may control the feedback loop (e.g., an update speed, a tracking speed, etc.) using a step size value. Additionally, or alternatively, PhiDiff1 Update 1315 may be configured to perform the steps shown by reference numbers 1345 and 1350 at a particular clock cycle interval (e.g., every 32 clock cycles, where DMA 1305 averages error values over 32 clock cycles).

The output from the integrator for sub-carrier s may be represented as phiDiff_1[s], which may represent a phase difference between the X polarization and the Y polarization of sub-carrier s. As shown, PhiDiff1 Update 1315 may provide this value to FAPC 515, which may use the value to compensate a phase of an input signal.

Figure 13C:
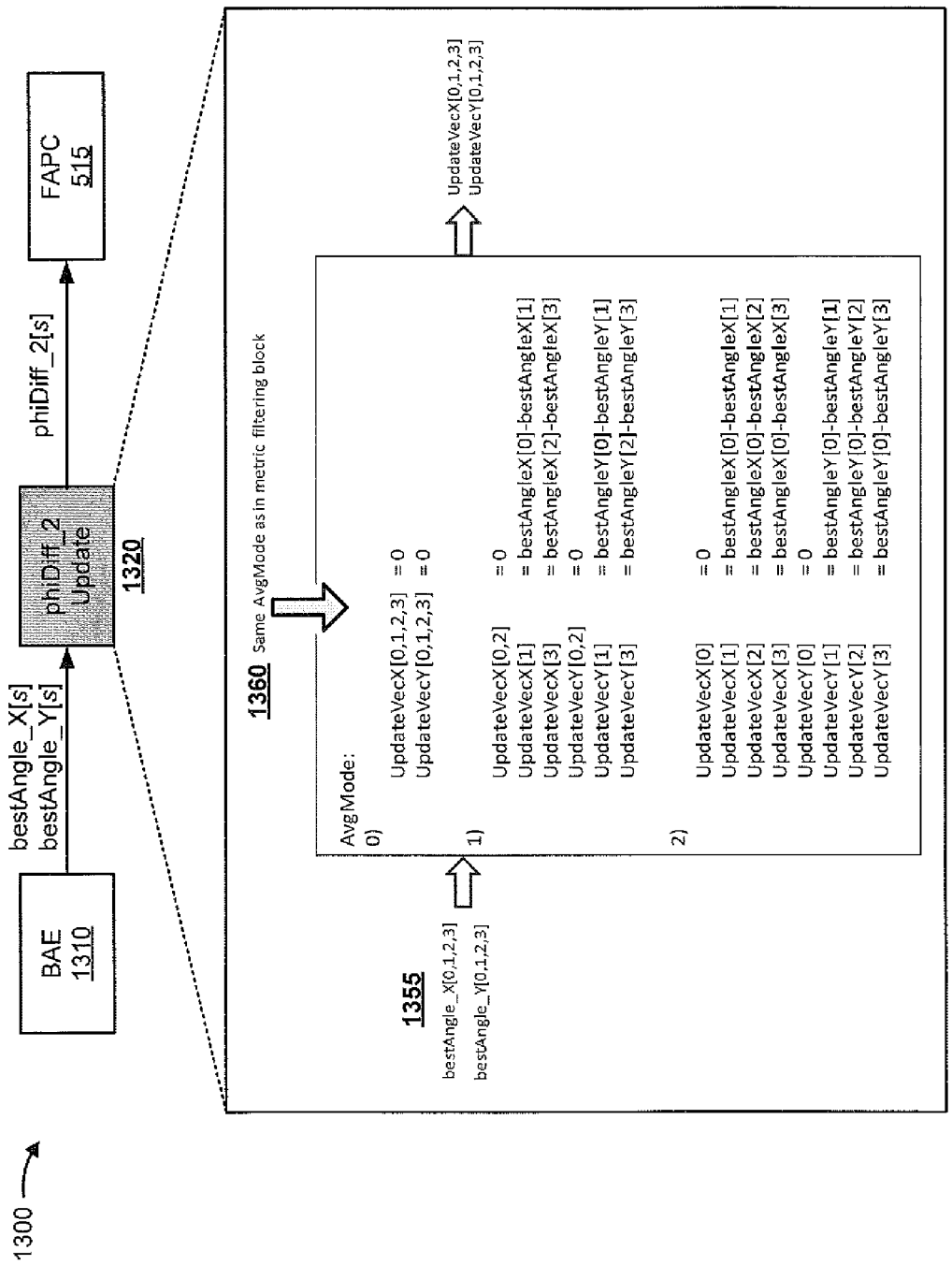

As shown in FIG. 13C, and by reference number 1355, PhiDiff2 Update 1320 may receive, for each sub-carrier, a first interpolated phase estimate value for the X polarization and a second interpolated phase estimate value for the Y polarization. As shown by reference number 1360, PhiDiff2 Update 1320 may determine an AvgMode indicator value, which may be the same as the Avg_Mode indicator value discussed herein in connection with MF 525. PhiDiff2 Update 1320 may determine a manner in which to update interpolated phase estimates, for a particular polarization and across multiple sub-carriers, based on the AvgMode value.

As an example, when AvgMode is equal to a first value (e.g., 0), then each sub-carrier may be treated independently, and PhiDiff2 Update 1320 may not update the interpolated phase estimate values. In this case, PhiDiff2 Update 1320 may set an update value for the X polarization (e.g., UpdateVecX[s]) to zero, and may set an update value for the Y polarization (e.g., UpdateVecY[s]) to zero.

As another example, when AvgMode is equal to a second value (e.g., 1), then PhiDiff2 Update 1320 may update the interpolated phase estimate values by averaging across two sub-carriers. For example, when there are four sub-carriers, PhiDiff2 Update 1320 may set two update values, for a particular polarization, to zero as a reference value. PhiDiff2 Update 1320 may set two other update values, for the particular polarization, as a difference between two interpolated phase estimate values for different sub-carriers (e.g., one of the reference phase estimate values and another phase estimate value). For example, on the X polarization, PhiDiff2 Update 1320 may set the following update values:

UpdateVec$X$[0]=0

UpdateVec$X$[1]=bestAngle$X$[0]−bestAngle$X$[1]

UpdateVec$X$[2]=0

UpdateVec$X$[3]=bestAngle$X$[2]−bestAngle$X$[3]

As another example, when AvgMode is equal to a third value (e.g., 2), then PhiDiff2 Update 1320 may update the interpolated phase estimate values by averaging across all sub-carriers. For example, when there are four sub-carriers, PhiDiff2 Update 1320 may set one update value, for a particular polarization, to zero as a reference value. PhiDiff2 Update 1320 may set three other update values, for the particular polarization, as a difference between a reference phase estimate value and each other phase estimate value. For example, on the X polarization, PhiDiff2 Update 1320 may set the following update values:

UpdateVecX[0]=0
UpdateVecX[1]=bestAngleX[0]−bestAngleX[1]
UpdateVecX[2]=bestAngleX[0]−bestAngleX[2]
UpdateVecX[3]=bestAngleX[0]−bestAngleX[3]

In some implementations, AvgMode may be a different value than described above, and PhiDiff2 Update 1320 may calculate the update values using combined interpolated phase estimate values in a different manner, and/or for a different quantity of sub-carriers.

Figure 13D:
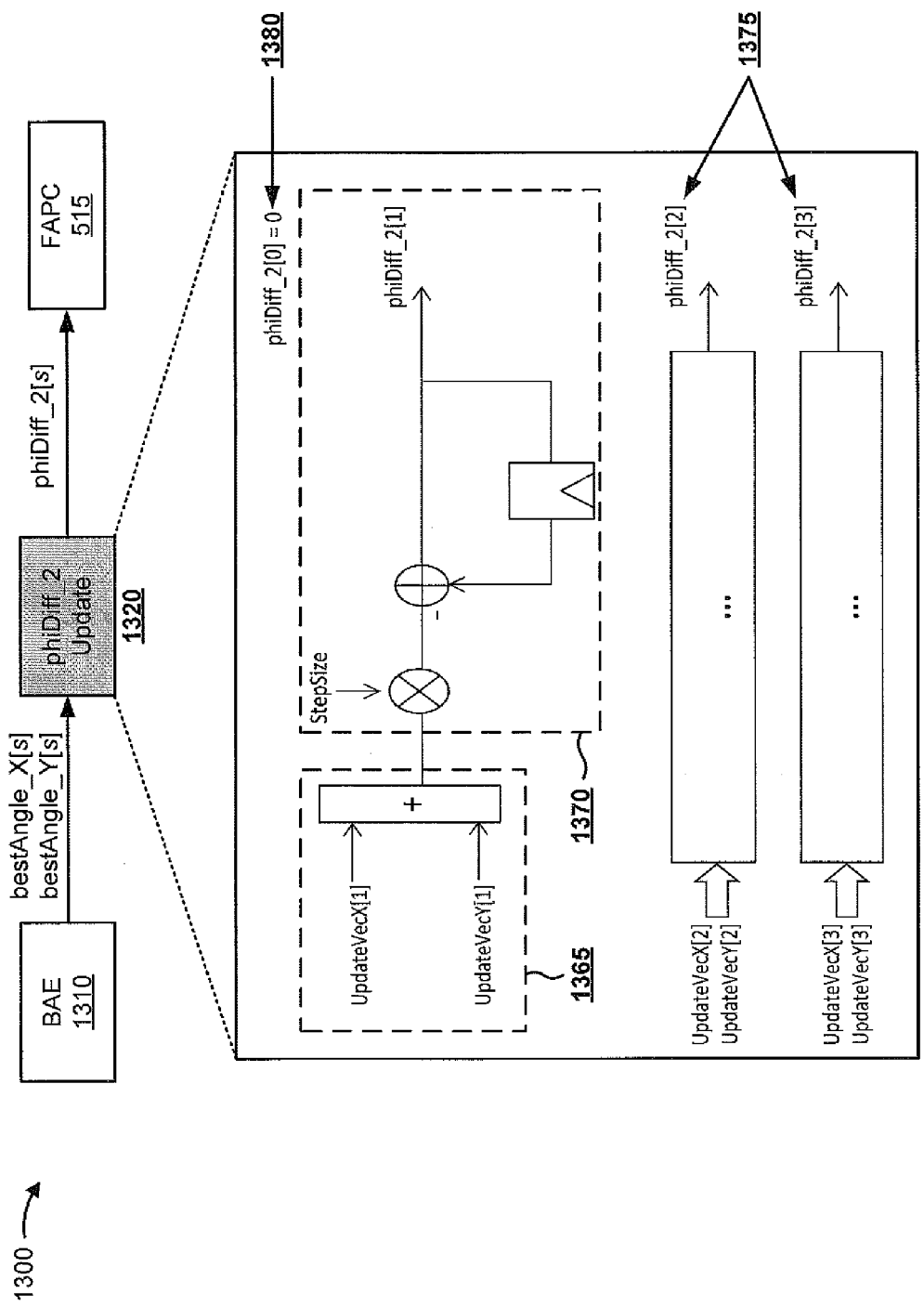

As shown in FIG. 13D, and by reference number 1365, PhiDiff2 Update 1320 may sum a first update value for the X polarization and a second update value for the Y polarization on a particular sub-carrier, such as the second sub-carrier (e.g., s=1). As shown by reference number 1370, PhiDiff2 Update 1320 may input the summed update value into a digital integrator to form a first order feedback loop to drive the difference between the update values toward zero. PhiDiff2 Update 1320 may control the feedback loop using a step size value. The output from the integrator for sub-carrier s may be represented as phiDiff_2[s], which may represent a phase difference between multiple sub-carriers, and which may be used to compensate a phase of an input signal carried by sub-carrier s. PhiDiff2 Update 1320 may provide phiDiff_2[s] to FAPC 515, which may use the value to compensate the phase of the input signal.

As shown by reference number 1375, PhiDiff2 Update 1320 may calculate the phase differences for the other sub-carriers in a similar manner. As shown by reference number 1380, such a calculation may result in a phiDiff_2 value of zero for a reference value.

As indicated above, FIGS. 13A-13D are provided merely as an example. Other examples are possible and may differ from what was described with regard to FIGS. 13A-13D. For example, PDE 560 may perform additional operations, fewer operations, or different operations than those described in connection with FIGS. 13A-13D.

The foregoing disclosure provides illustration and description, but is not intended to be exhaustive or to limit the implementations to the precise form disclosed. Modifications and variations are possible in light of the above disclosure or may be acquired from practice of the implementations.

Implementations described herein reduce the computational complexity of accurately estimating the phase of a received symbol, and provide accurate and efficient carrier recovery when signals are transmitted using multiple sub-carriers, rather than a single carrier.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising:
a digital signal processor configured to:
  receive a plurality of input signals carried by a respective plurality of sub-carriers;
  apply a plurality of test phases to each input signal of the plurality of input signals;
  determine a plurality of error values, respectively associated with the plurality of test phases, for each input signal of the plurality of input signals;
  selectively combine a first error value, of the plurality of error values and associated with a first signal of the plurality of input signals, and a second error value, of the plurality of error values and associated with a second signal of the plurality of input signals,
    the first signal being carried by a first sub-carrier of the plurality of sub-carriers,
    the second signal being carried by a second sub-carrier of the plurality of sub-carriers,
      the second sub-carrier being different from the first sub-carrier;
  calculate a plurality of updated metric values, respectively associated with the plurality of test phases, for a particular input signal of the plurality of input signals, based on selectively combining the first error value and the second error value;
  compare the plurality of updated metric values associated with the particular input signal;
  determine a test phase, of the plurality of test phases, that represents an estimated phase, associated with the particular input signal, based on comparing the plurality of updated metric values;
  determine a phase estimate value based on the test phase; and
  provide the phase estimate value to modify the particular input signal.

2. The optical receiver of claim 1, where the digital signal processor, when selectively combining the first error value and the second error value, is further configured to:
  determine a mode indicator value that indicates whether to combine the first error value and the second error value; and
  selectively combine the first error value and the second error value based on the mode indicator value.

3. The optical receiver of claim 1, where the digital signal processor, when selectively combining the first error value and the second error value, is further configured to:
  determine a mode indicator value that indicates whether to combine the first error value and the second error value; and
  selectively perform a first action or a second action based on the mode indicator value,
    the first action including combining the first error value and the second error value when the mode indicator value is equal to a first value,
    the second action including preventing the first error value and the second error value from being combined when the mode indicator value is equal to a second value.

4. The optical receiver of claim 1, where the digital signal processor, when selectively combining the first error value and the second error value, is further configured to:
  determine a mode indicator value that indicates a quantity of error values, of the plurality of error values, to be combined; and
  selectively perform a first action or a second action based on the mode indicator value,
    the first action including combining a first quantity of error values when the mode indicator value is equal to a first value,
    the second action including combining a second quantity of error values when the mode indicator value is equal to a second value,
      the second quantity being different from the first quantity.

5. The optical receiver of claim 4, where the first quantity is less than a quantity of sub-carriers included in the plurality of sub-carriers; and
  where the second quantity is equal to the quantity of sub-carriers included in the plurality of sub-carriers.

6. The optical receiver of claim 1, where the digital signal processor, when determining the test phase, is further configured to:

determine the test phase based on a minimum updated metric value of the plurality of updated metric values.

7. The optical receiver of claim 6, where the digital signal processor, when determining the phase estimate value, is further configured to:
   interpolate the phase estimate value based on the minimum updated metric value and at least one other updated metric value included in the plurality of updated metric values.

8. The optical receiver of claim 1, where the digital signal processor, when receiving the plurality of input signals, is further configured to:
   modify a plurality of received signals to form the plurality of input signals; and
   receive the plurality of input signals based on modifying the plurality of received signals.

9. A system comprising,
   an optical receiver configured to:
      receive a plurality of input signals carried by a respective plurality of sub-carriers;
      apply a plurality of test phases to each input signal of the plurality of input signals;
      determine a plurality of error values, respectively associated with the plurality of test phases, for each input signal of the plurality of input signals;
      calculate a plurality of updated metric values, respectively associated with the plurality of test phases, for a particular input signal of the plurality of input signals, based on a first error value and a second error value of the plurality of error values,
         the first error value being associated with a first sub-carrier of the plurality of sub-carriers,
         the second error value being associated with a second sub-carrier of the plurality of sub-carriers,
            the second sub-carrier being different from the first sub-carrier;
      compare the plurality of updated metric values associated with the particular input signal;
      determine a test phase, of the plurality of test phases, that represents an estimated phase, associated with the particular input signal, based on comparing the plurality of updated metric values;
      determine a phase estimate value based on the test phase; and
      provide the phase estimate value to modify the particular input signal.

10. The system of claim 9, where the optical receiver, when calculating the plurality of updated metric values, is further configured to:
    selectively combine the first error value and the second error value; and
    calculate the plurality of updated metric values based on selectively combining the first error value and the second error value.

11. The system of claim 9, where the optical receiver, when determining the plurality of error values, is further configured to:
    determine a first metric value that represents an error associated with a first polarization of the particular input signal;
    determine a second metric value that represents an error associated with a second polarization of the particular input signal,
       the second polarization being different than the first polarization;
    combine the first metric value and the second metric value;
    determine an error value, of the plurality of error values and associated with the particular input signal, based on combining the first metric value and the second metric value.

12. The system of claim 9, where the optical receiver, when comparing the plurality of updated metric values, is further configured to:
    determine a minimum updated metric value of the plurality of updated metric values; and
    where the optical receiver, when determining the test phase, is further configured to:
       determine the test phase associated with the minimum updated metric value.

13. The system of claim 9, where the optical receiver, when comparing the plurality of updated metric values, is further configured to:
    determine a minimum updated metric value of the plurality of updated metric values;
    where the optical receiver, when determining the test phase, is further configured to:
       determine the test phase associated with the minimum updated metric value; and
    where the optical receiver, when determining the phase estimate value, is further configured to:
       interpolate the phase estimate value based on the determined test phase and at least one other test phase included in the plurality of test phases.

14. The system of claim 9, where the optical receiver, when comparing the plurality of updated metric values, is further configured to:
    identify a first group of updated metric values included in the plurality of updated metric values;
    identify a second group of updated metric values included in the plurality of updated metric values,
       the second group being different than the first group;
    determine a first minimum updated metric value from the first group;
    determine a second minimum updated metric value from the second group;
    compare the first minimum updated metric value and the second minimum updated metric value;
    select the first minimum updated metric value or the second minimum updated metric value as an overall minimum updated metric value based on comparing the first minimum updated metric value and the second minimum updated metric value; and
    where the optical receiver, when determining the test phase, is further configured to:
       determine the test phase associated with the overall minimum updated metric value.

15. The system of claim 14, where the optical receiver, when selecting the first minimum updated metric value or the second minimum updated metric value as the overall minimum updated metric value, is further configured to:
    determine whether the first minimum updated metric value or the second minimum updated metric value has been selected;
    selectively set a group indicator value based on determining whether the first minimum updated metric value or the second minimum updated metric value has been selected,
       the group indicator value being set to a first value when the first minimum updated metric value has been selected,
       the group indicator value being set to a second value when the second minimum updated metric value has been selected, the second value being different from the first value; and output the group indicator value to control whether a third minimum updated metric value or a fourth minimum final metric value is selected in association with determining another test phase associated with another input signal.

16. A method, comprising:

receiving, by an optical receiver, a plurality of input signals carried by a respective plurality of sub-carriers;

applying, by the optical receiver, a plurality of test phases to each input signal of the plurality of input signals;

determining, by the optical receiver, a plurality of error values, respectively associated with the plurality of test phases, for each input signal of the plurality of input signals;

calculating, by the optical receiver, a plurality of final error values, respectively associated with the plurality of test phases, for a particular input signal of the plurality of input signals, based on a first error value and a second error value of the plurality of error values, the first error value being associated with a first sub-carrier of the plurality of sub-carriers, the second error value being associated with a second sub-carrier of the plurality of sub-carriers, the second sub-carrier being different from the first sub-carrier;

comparing, by the optical receiver, the plurality of final error values, associated with the particular input signal, to determine a minimum final error value of the plurality of final error values;

identifying, by the optical receiver, a test phase, of the plurality of test phases, associated with the minimum final error value;

determining, by the optical receiver and based on the identified test phase, a phase estimate value that represents an estimated phase associated with the particular input signal; and providing, by the optical receiver, the phase estimate value to modify the particular input signal.

17. The method of claim 16, where calculating the plurality of final error values further comprises:

combining the first error value and the second error value; and calculating the plurality of final error values based on combining the first error value and the second error value.

18. The method of claim 16, where calculating the plurality of final error values further comprises:

identifying a mode indicator value that indicates whether the first error value and the second error value are to be combined;

selectively performing a first action, a second action, or a third action based on the mode indicator value, the first action including preventing the first error value and the second error value from being combined when the mode indicator value is equal to a first value, the second action including combining a first quantity of error values, including the first error value and the second error value, when the mode indicator value is equal to a second value, the second value being different from the first value, the third action including combining a second quantity of error values, including the first error value and the second error value, when the mode indicator value is equal to a third value, the second quantity being different from the first quantity, the third value being different from the first value and the second value;

and calculating the plurality of final error values based on selectively performing the first action, the second action, or the third action.

19. The method of claim 16, where providing the phase estimate value further comprises:

providing the phase estimate value, via an output path, to a first component to modify the particular input signal; and providing the phase estimate value, via a feedback path, to a second component to modify a different input signal, the different input signal being received after the particular input signal.

20. The method of claim 16, where the plurality of input signals is a plurality of first input signals;

where the plurality of test phases is a plurality of first test phases;

where the phase estimate value is a first phase estimate value;

where the particular input signal is a first particular input signal; and where the method further comprises:

receiving a plurality of second input signals carried by the plurality of sub-carriers;

applying a plurality of second test phases to each second input signal of the plurality of second input signals, a quantity of second test phases included in the plurality of second test phases being fewer than a quantity of first test phases included in the plurality of first test phases;

determining a second phase estimate value, that represents an estimated phase associated with a second particular input signal of the plurality of second input signals; and providing the second phase estimate value to modify the second particular input signal.

* * * * *